United States Patent
Zhong

(10) Patent No.: US 7,660,651 B2
(45) Date of Patent: Feb. 9, 2010

(54) CORE AREA TERRITORY PLANNING FOR OPTIMIZING DRIVER FAMILIARITY AND ROUTE FLEXIBILITY

(75) Inventor: Hongsheng Zhong, Cockeysville, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 11/962,871

(22) Filed: Dec. 21, 2007

(65) Prior Publication Data

US 2008/0147473 A1 Jun. 19, 2008

Related U.S. Application Data

(62) Division of application No. 10/647,062, filed on Aug. 22, 2003, now Pat. No. 7,363,126.

(60) Provisional application No. 60/405,138, filed on Aug. 22, 2002.

(51) Int. Cl.
    *H04W 84/00* (2006.01)
(52) U.S. Cl. .............. 701/25; 342/357.07; 342/357.08; 702/31; 702/32; 702/181
(58) Field of Classification Search .................. 701/25; 342/357.07, 357.08; 702/31, 32, 181
    See application file for complete search history.

(56) References Cited

U.S. PATENT DOCUMENTS

| | | | |
|---|---|---|---|
| 5,122,959 A | 6/1992 | Nathanson et al. | |
| 5,197,009 A | 3/1993 | Hoffman, Jr. et al. | |
| 5,255,349 A | 10/1993 | Thakoor et al. | |
| 5,272,638 A | 12/1993 | Martin et al. | |
| 5,568,381 A | 10/1996 | Hara et al. | |
| 5,974,317 A * | 10/1999 | Djuknic et al. | 455/431 |
| 5,983,198 A | 11/1999 | Mowery et al. | |
| 6,084,547 A * | 7/2000 | Sanderford et al. | 342/457 |
| 6,232,915 B1 * | 5/2001 | Dean et al. | 342/357.07 |
| 6,236,365 B1 * | 5/2001 | LeBlanc et al. | 342/457 |
| 6,272,483 B1 | 8/2001 | Joslin et al. | |
| 6,418,398 B1 | 7/2002 | Dueck et al. | |
| 6,510,384 B2 | 1/2003 | Okano | |
| 6,532,417 B2 * | 3/2003 | Hatano | 701/207 |
| 6,650,284 B1 * | 11/2003 | Mannings et al. | 342/357.09 |
| 7,123,893 B1 * | 10/2006 | Austin et al. | 455/278.1 |
| 7,379,959 B2 * | 5/2008 | Hinni et al. | 709/202 |

(Continued)

OTHER PUBLICATIONS

Coleman, M.J.; Allan, J. "Automated quality tracking", UK IT 1990 Conference, Mar. 19-22, 1990 pp. 149-153.*

*Primary Examiner*—Tuan C To
(74) *Attorney, Agent, or Firm*—Alston & Bird LLP

(57) ABSTRACT

Route planning methods for use by a package delivery service provider are disclosed that satisfy a stochastic daily demand while taking advantage of drivers' route familiarity over time. A model for estimating the value of driver familiarity is disclosed along with both an empirical and a mathematical model for estimating the value of route consistency, along with a Core Area Route Design which involves the concepts of combinatorial optimization, meta-heuristic algorithms, tabu search heuristics, network formulation modeling, and multi-stage graph modeling. In one embodiment, a service territory is divided into unassigned cells associated with a grid segment involving prior driver delivery stops, and a driver from a pool of unassigned drivers is assigned to a route based on examining each driver's grid segment visiting frequency limit with respect to a minimum limit so as to optimize driver selection based on of each driver's familiarity with the route.

9 Claims, 14 Drawing Sheets

U.S. PATENT DOCUMENTS

| | | |
|---|---|---|
| 2002/0046073 A1 | 4/2002 | Indseth et al. |
| 2002/0082772 A1 | 6/2002 | Okano |
| 2003/0014286 A1 | 1/2003 | Cappellini |
| 2003/0028319 A1 | 2/2003 | Khavakh et al. |
| 2003/0033083 A1 | 2/2003 | Nakashima et al. |
| 2003/0060924 A1 | 3/2003 | Ye et al. |
| 2003/0065625 A1* | 4/2003 | Rosenbaum et al. .......... 705/75 |
| 2003/0084011 A1* | 5/2003 | Shetty ........................ 706/13 |
| 2003/0093391 A1 | 5/2003 | Shackleford |
| 2003/0135304 A1 | 7/2003 | Sroub et al. |

* cited by examiner

Driver Smith (23)
Monday

Driver Smith (23)
Tuesday

Driver Smith
Monday

Driver Smith
Tuesday

**Driver Smith
During the Reference Period**

**Driver Smith
During the Reference Period**

Number of Visitors to the Cell by a Driver

CORE AREA TERRITORY PLANNING FOR OPTIMIZING DRIVER FAMILIARITY AND ROUTE FLEXIBILITY

CROSS REFERENCE TO RELATED APPLICATIONS

This application is a divisional application of U.S. patent application Ser. No. 10/647,062, filed Aug. 22, 2003 now U.S. Pat. No. 7,363,126 and entitled "Core Area Territory Planning for Optimizing Driver Familiarity and Route Flexibility," which claims the benefit and priority of the U.S. Provisional Patent Application bearing Ser. No. 60/405,138, filed Aug. 22, 2002, both of which are incorporated herein by reference.

FIELD

The material described herein relates generally to the field of vehicle route planning and, more particularly, to the task of planning optimal delivery routes that satisfy a stochastic daily demand while promoting driver familiarity over time.

BACKGROUND

The planning of efficient delivery routes presents a variety of technical and logistical challenges. Routes may be fixed or variable. Postal mail delivery is an example of a fixed-route system, in which deliveries are made to the same addresses each day along a fixed route. Variable routes greatly complicate the route planning process. In many modern service businesses, delivery routes change in order to accommodate the changing needs of customers. In a parcel delivery service business, for example, delivery and pickup routes change frequently, as often as every day. Incremental improvements in efficiency within a variable-route system can yield great dividends in performance, profitability, and overall value.

A region to be served by a business may be divided into a collection of local service territories. Each service territory may include one or more hubs, from which a staff of service providers (drivers) in a fleet of vehicles may be dispatched to serve the territory. For many types of businesses, customer participation and daily demand are generally stochastic (random). A subset of customers with a repeating or daily need may sometimes be identified. Generally, however, the list of participating customer addresses will vary significantly on any given day. The types of services provided along the route may also vary significantly. For example, the service may include pickups as well as deliveries. Additionally, the service types often include specific pickup times or guaranteed delivery times.

The system constraints on a service business include the number and capacity of the vehicles in its fleet, the number of drivers, and the number of hours in a work day. The geography of the service territory also creates a unique set of constraints and challenges.

One approach to serving a territory, for example, may include dispatching vehicles from a central hub to a specific outlying area or cluster. The cluster method is not the most efficient approach for several reasons, including the fact that each vehicle is not being fully utilized between the hub and the outlying cluster. The inefficiencies of the cluster method increase as a service territory grows in size.

Another approach sometimes used for a service territory, for example, is to dispatch vehicles along major roads extending away from the hub, and along the same or different major roads when returning to the hub at the end of the work day. While this practice of dividing the territory into loop routes may meet customer demand, it is typically not the most optimal way to service an area. Like the cluster method, the loop method becomes less and less efficient as the service territory grows in size and the loops become narrower and longer.

Other approaches developed based on experience or tradition also become inefficient over time and result in significant losses in productivity when a service territory grows in size and complexity.

A variety of mathematical solutions have been developed in the field which attempt to generate solutions for the so-called Vehicle Routing Problem (VRP). These complex algorithms are generally impractical for daily route planning because they typically require far too much computation time. Add the variable of stochastic customer demand, and the mathematical algorithms grow more complex and require even longer computation times. Thus, there exists a need in the art for a route planning and optimization system capable of generating a solution quickly enough to dispatch a fleet of vehicles on a daily basis.

Driver familiarity with particular routes and customers is a goal for many service businesses. To date, however, the factor of driver familiarity has not been considered when planning daily routes that are optimized on a daily basis to meet a variable demand. Thus, there exists a need in the art for a route planning and optimization system that promotes driver familiarity while meeting the efficiency requirements of a stochastic demand.

SUMMARY

The following summary is not an extensive overview and is not intended to identify key or critical elements of the matter disclosed, nor is it intended to delineate the scope of such elements. This Summary provides a conceptual introduction in a simplified form as a prelude to the more-detailed description that follows.

Certain illustrative and exemplary systems, methods, and apparatuses are described herein in connection with the following description and the accompanying drawing figures. The examples discussed represent only a few of the various ways of applying the principles supporting the material disclosed and, thus, the examples are intended to include equivalents. Other advantages and novel features may become apparent from the detailed description which follows, when considered in conjunction with the drawing figures.

The examples described herein include a method of optimizing a route plan having a plurality of routes within a service territory. The method may include:

(a) dividing the service territory into a plurality of unassigned cells;

(b) identifying from among a staff of drivers a most frequent driver for each of the plurality of unassigned cells based upon an average cell visit frequency to each of the plurality of unassigned cells by each of the drivers during a reference period, wherein the average cell visit frequency represents a comparison between a number of visits to each of the unassigned cells during the reference period and a number of total visits to any of the plurality of unassigned cells during the reference period;

(c) establishing a minimum average cell visit frequency; and (d) classifying each of the unassigned cells as a core cell and assigning each core cell to a corresponding most frequent driver, if the corresponding average cell visit frequency is greater than the minimum average cell visit frequency.

Where a territory includes a hub, the initial step of dividing the service territory may include classifying one or more of the unassigned cells as a flex zone cell, based upon a proximity factor relating each of the unassigned cells to the hub, wherein the proximity factor comprises at least a distance element.

Any remaining unassigned cell may be classified as a daily cell and assigned to a nearby route.

In another aspect, the examples described herein include a method of optimizing a route plan within a service territory, where the route plan may include a plurality of unassigned routes. The method may include:

(a) selecting a new route for optimization from the plurality of unassigned routes;

(b) selecting a reference day on which a route was driven by a driver;

(c) defining a convex hull polygon about the route;

(d) defining a plurality of unassigned convex hull polygons about each of the plurality of unassigned routes;

(e) comparing the convex hull polygon to each of the plurality of unassigned convex hull polygons and calculating a corresponding plurality of hull overlap areas;

(f) identifying a maximum hull overlap area from among the plurality of hull overlap areas, the maximum hull overlap area corresponding to a maximum route from among the plurality of unassigned routes;

(g) defining the new route to include the maximum route;

(h) classifying the new route as an assigned route;

(i) repeating steps (a) through (i) a number of times equal to the number of members of the plurality of unassigned routes.

In another aspect, the examples described herein include a method of maximizing driver visit frequency to one or more customers located at one or more respective stops within a service territory, the new driver being part of a pool of unassigned drivers. The method may include:

(a) selecting a new driver from the pool of unassigned drivers;

(b) identifying a plurality of cells, where each cell may include a group of the one or more stops located within an area suitable for service by the new driver during a finite workday;

(c) classifying one or more of the plurality of cells as core cells if a known service volume for each of the core cells exceeds a minimum;

(d) establishing one or more core areas, each may include a localized cluster of the one or more core cells;

(e) selecting a new core area from the one or more core areas based upon a known driver visit frequency by the new driver to each of the one or more core areas; and (f) assigning the new driver to service the new core area;

(g) classifying the new driver as an assigned driver;

(h) repeating steps (a) through (g) a number of times equal to the number of members of the pool of unassigned drivers.

Any cell located outside any of the new core areas may be classified as a daily cell and assigned to the nearest assigned driver. Similarly, any stop located outside any of the new core areas or outside any of the daily cells may be classified as a daily stop and assigned to the nearest assigned stop driver.

In another aspect, the examples described herein include a method of approximating the workload within a cell along a route, where the route may include a total distance and a number of stops within the cell. The method may include:

(a) estimating a mean time duration for each of the stops;

(b) estimating an average velocity along the route;

(c) solving a convex hull heuristic algorithm to quantify the total distance and to identify a longest arc distance between any two of the stops;

(d) calculating a stop time factor defined by the number of stops multiplied by the mean time duration;

(e) calculating a travel time factor defined by a quantity divided by the average velocity, the quantity defined by the total distance minus the longest arc distance; and (f) adding the stop time factor and the travel time factor to obtain an approximate workload.

In another aspect, the examples described herein include a method of formulating a new algorithm to solve a stochastic vehicle routing problem in a service territory. The method may include adapting a classical vehicle routing problem algorithm using a set of constraints related to the stochastic problem to form the new algorithm, the set of constraints may include a cost constraint, a core constraint, and a driver learning constraint.

A method of formulating the cost constraint may include identifying a plurality of cells in the service territory, each cell may include a group of one or more localized stops; and formulating an insertion cost expression to calculate a cost of inserting each of the localized stops into a route, for each of the plurality of cells, the cost expression producing a solution to serve as the cost constraint.

A method of formulating the core constraint may include classifying one or more of the plurality of cells as core cells if a known service volume for each of the core cells exceeds a minimum; constructing a partial route between and among the core cells; and using the partial route as a starting point for the new algorithm, the starting point representing a solution to serve as the core constraint.

A method of formulating the driver learning constraint may include building a driver performance matrix including historical route driver data; applying the driver performance matrix as a multiplier to augment a total time factor and a cellular time factor, the time factors being part of a driver learning curve function; and finding a solution of the driver learning curve function, the solution to serve as the driver learning constraint.

In another aspect, the examples described herein include computer systems for carrying out one or more methods or portions of methods. A computer system may include a central processing unit, a memory coupled to the central processing unit, and a display screen coupled to the central processing unit. The central processing unit may be programmed or otherwise configured to execute the steps of processes described in the disclosed methods.

DETAILED DESCRIPTION

Figure 1:
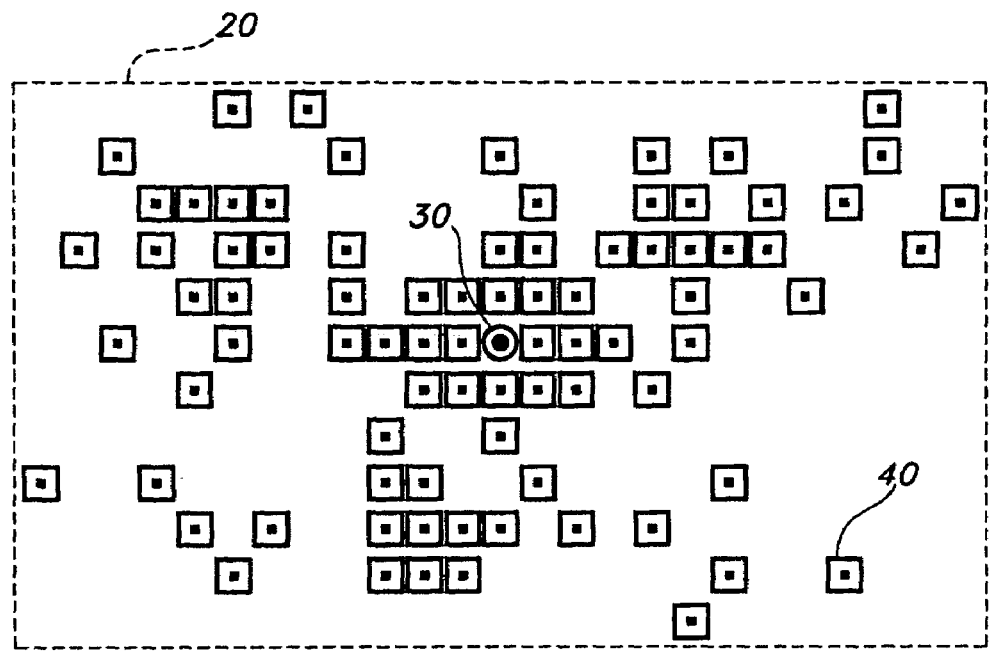
FIG. 1 is an illustration of a service territory map, showing a central hub and a group of delivery areas or cells, according to one embodiment of the present invention.

The subject matter of this application is related to that of U.S. Provisional Patent Application bearing Ser. No. 60/405,138, filed Aug. 22, 2002, which is incorporated herein by reference.

1. Introduction

Exemplary systems, methods, and apparatuses are now described with reference to the drawing figures, where like reference numerals are used to refer to like elements throughout the several views. In the following description, for purposes of explanation, numerous specific details are set forth in order to facilitate a thorough understanding of the systems, methods, apparatuses, and the like. It may be evident, however, that the exemplars described may be practiced without these specific details. In other instances, common structures and devices are shown in block diagram form in order to simplify the description.

As used in this application, the term "computer component" refers to a computer-related entity, either hardware, firmware, software, a combination thereof, or to software in execution. For example, a computer component can be, but is not limited to being, a process running on a processor, a processor itself, an object, an executable, a thread of execution, a program, and a computer. By way of illustration, both an application running on a server and the server itself can be a computer component. One or more computer components cans reside within a process and/or thread of execution and a computer component can be localized on a single computer and/or distributed between and among two or more computers.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

"Data store," as used herein, refers to a physical and/or logical entity that can store data. A data store may be, for example, a database, a table, a file, a list, a queue, a heap, and so on. A data store may reside in one logical and/or physical entity and/or may be distributed between two or more logical and/or physical entities.

The systems, methods, apparatuses, and objects described herein may be stored, for example, on a computer readable media. Media may include, but are not limited to, an ASIC, a CD, a DVD, a RAM, a ROM, a PROM, a disk, a carrier wave, a memory stick, and the like. Thus, an example computer readable medium can store computer executable instructions for a method for managing transportation assets. The method includes planning a route for a transportation asset based on the analysis of data retrieved from an experience-based route database.

To the extent that the term "includes" is employed in the detailed description or the claims, it is intended to be inclusive in a manner similar to the term "comprising" as that term is interpreted when employed as a transitional word in a claim. Further still, to the extent that the term "or" is employed in the claims (for example, A or B) it is intended to mean "A or B or both." When the author intends to indicate "only A or B but not both," the author will employ the phrase "A or B but not both." Thus, use of the term "or" herein is the inclusive use, not the exclusive use. See Bryan A. Garner, A Dictionary Of Modern Legal Usage 624 (2d ed. 1995).

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/ or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

2. A Service Territory

Figure 2:
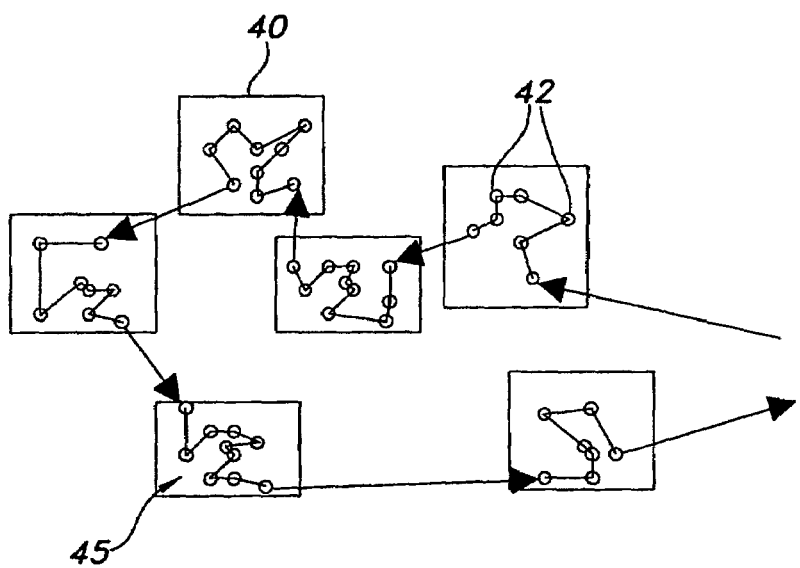
FIG. 2 is an illustration of several individual cells along a route, according to one embodiment of the present invention.

FIG. 1 illustrates a service territory 20 having a central hub 30 and a plurality of discrete delivery areas referred to herein as cells 40. In this context, a cell 40 can be thought of as the minimum unit of a service territory 20 within which all the customers or stops 42 may be serviced by a single driver. Within a cell 40, as depicted in FIG. 2, a travel route may include a sub-route 45 between and among one or more stops 42 within the cell 40. Each stop 42 may include one or more services, such as a parcel delivery or pickup.

In one embodiment, the method of the present invention involves grouping nearby stops 42 into cells 40. Stops 42 referred to as being localized are sufficiently close together to form a cell 40. As a general rule, stops 42 are located closely enough together to form a cell 40 if the cell can be serviced completely by a single driver during a workday. In a practical application, a service territory 20 may be partitioned into cells 40 by neighborhood, office building, industrial park, by ZIP+2 or ZIP+4 codes, for example, or by any other manageable unit.

Gathering customers into cells 40 both simplifies the route planning process and more accurately represents the actual driver experience of learning about particular cells 40 within a service territory 20. In the context of a parcel delivery service, a service territory 20 may be served using a route plan that includes one or more travel routes.

Planning daily routes to a changing set of participating customers in a service territory 20 is a task sometimes referred to in the field as a random or stochastic Vehicle Routing Problem (VRP). The methods for planning daily routes disclosed herein include modifications and variations of the stochastic VRP to produce timely and useful solutions.

3. Workload Within a Cell

Because a cell 40 is the minimum unit of work assigned to each driver, the approximation of the workload within a cell 40 is needed. Customer demand can be described in terms of a known customer set where: (1) each customer has a probability of participating on a particular day; and (2) the volume of the demand varies each day; for example, in terms of the number of parcel. In the context of a parcel delivery service, the identity of each participating customer and the demand volume for the day is generally learned before the route plans are generated each day.

In one aspect of the invention, a method for approximating the workload within a cell 40 is accomplished, generally, by solving the traditional Traveling Salesman Problem (TSP) within each cell 40 when the customer location and demand becomes known. The workload approximation model may be expressed as:

$$W_i = n_i s_i + (TSP_i - L_{max})/v_i$$

where:
  $W_i$ is the workload within a cell 40;
  $n_i$ is the number of stops 42 in a cell 40;
  $s_i$ is the mean time duration for each stop 42;
  $TSP_i$ is the total distance traveled within a cell 40;
  $L_{max}$ is the distance of the longest arc on the optimal TSP route; and
  $v_i$ is the average vehicle velocity along the route.

The element $n_i s_i$ in the workload model may be referred to as a stop time factor. The element $(TSP_i - L_{max})/v_i$ may be referred to as a travel time factor.

In one embodiment, the method of the present invention places a higher priority on computing time than on solution quality when solving the Traveling Salesman Problem (TSP) in this context. Quicker results may greatly improve computation efficiency, whereas the delay of obtaining highly-accurate results may harm efficiency. Because quick computing times are desired, the method incorporates a procedure called a Convex Hull heuristic algorithm To apply the Convex Hull heuristic algorithm, the following steps may be followed:
  (1) Create the convex hull of all the stops 42 within a cell 40. The convex hull of a set of points is defined as the smallest convex polygon that encloses all the points. In this procedure, the convex hull may form an outer loop of hull stops k which, when connected, produce a sub-route 45 within the cell 40. The sub-route 45 of hull stops k serves as a starting point for the computation.
  (2) For each stop 42 that is not a hull stop k, find the best insertion position (between stop i and stop j), such that $(d_{ik} + d_{kj} - d_{ij})$ is minimal, where $d_{ik}$ is the distance between stop i and k, etc.
  (3) For each solution (a sequence of stops: i, k, j) found in step 2, select the best insertion stop k* and its best insertion position (between stop i* and stop j*), such that $(C_{i^* k^*} + C_{k^* j^*})/C_{i^* j^*}$ is minimal.
  (4) Insert stop k* into the sub-route 45 between stop i* and stop j*.

(5) Repeat steps 2, 3, and 4, until all the stops 42 in the sub-route 45 are ordered such that each stop 42 is visited exactly once.

The Convex Hull heuristic algorithm produces an optimal TSP sub-route within a cell 40. The distances between each stop dik may be summed to find the total distance $TSP_i$ traveled within the cell 40. Furthermore, because each segment between stops is known, the algorithm may also be used to determine the distance $L_{max}$ of the longest arc on the optimal TSP sub-route. These values, $TSP_i$ and $L_{max}$ may be used to solve the workload approximation model and approximate the workload $W_i$ within a cell 40.

The Convex Hull heuristic algorithm as well as the workload approximation equation may be solved by a computer system, programmed to execute the method.

4. Cell-to-Cell Travel Distance

The cell-to-cell travel distance plays a role in daily route planning because it affects the cost of inserting a stop along a route. The first stop in a cell may be called the entry stop; the last stop may be called the exit stop. The distance from cell i to cell j is expressed as $d_{ij}$ and it represents the distance from the exit stop in cell i to the entry stop in cell j.

Instead of using the centroid-to-centroid distance between cells to estimate the cell-to-cell distance, one embodiment of the present invention includes the following distance model:

$$d_{ij} = b_{ij} + \alpha_1 \frac{\sqrt{a_i}}{\sqrt{n_i}} + \alpha_2 \frac{\sqrt{a_j}}{\sqrt{n_j}}$$

where:
 $d_{ij}$ is the estimated cell-to-cell distance;
 $b_{ij}$ is the closest boundary distance between cell i and cell j;
 $n_i$ is the number of stops in cell i; and
 $a_i$ is the geographic area of cell i.

As the number of stops $n_i$ in each cell increases, the distance between adjacent stops decreases; and, thus, the two additive elements in the equation will decrease and approach zero. Also, as the number of stops $n_i$ increases and fills the cell, the stops become located nearer to the cell boundary; and, thus, the cell-to-cell distance $d_{ij}$ will decrease and approach the boundary distance $b_{ij}$.

The coefficients $\alpha_1, \alpha_2$ in the second and third additive elements of the equation represent the average travel distance between two stops in each cell, based upon a continuous Traveling Salesman Problem estimation model. Values for the coefficients $\alpha_1, \alpha_2$ may be estimated from actual route data, using an empirical simulation method. The values for the coefficients $\alpha_1, \alpha_2$ may then be used to solve the cell-to-cell distance equation.

5. The Value of Driver Familiarity

Driver familiarity is optimal when a driver travels the same route every day. But in stochastic systems were customers and demand change daily, the routes also change daily.

In one aspect, the route planning systems disclosed herein provide an estimate of the value of driver familiarity. Although the general importance of driver familiarity may have been recognized qualitatively, the present invention provides a quantitative analysis of driver familiarity in the context of route planning. In the planning systems disclosed, the concepts of the learning curve, the forgetting curve, and a dynamic learning function are applied to the phenomenon of driver familiarity. The route planning systems disclosed also include and incorporate an expected driver performance level for a particular visit frequency to a cell.

5.1. The Learning Curve

A learning curve describes the improvement by a person who performs a task repetitively. As the number of attempts or cycles increases, the overall cost per cycle decreases. In the context of route planning, a driver's performance may be approximated in terms of the time required to finish the workload within a given cell. In one aspect of the present invention, driver performance may be directly related to the frequency of visiting the same cell. A high visit frequency to a cell promotes driver familiarity within the cell and, in turn, improves driver performance overall.

Figure 11:
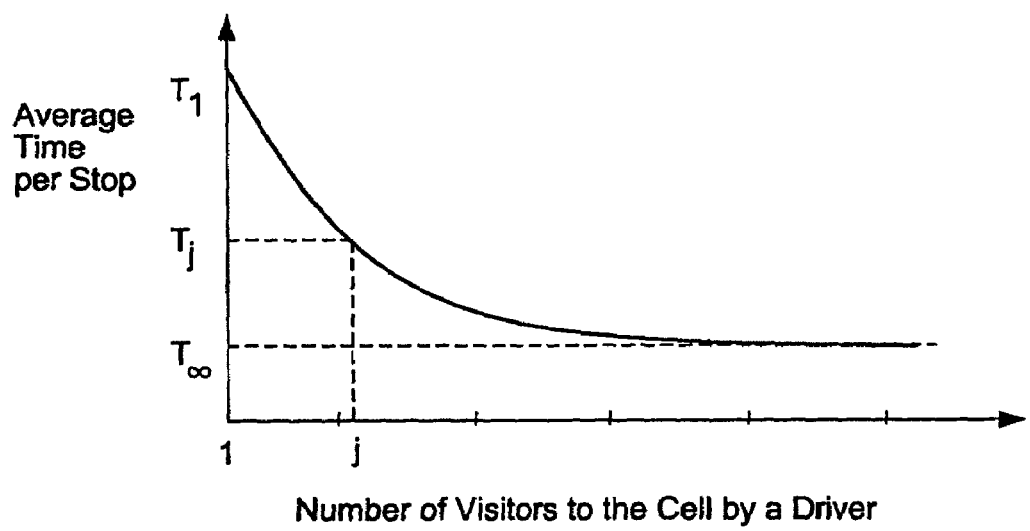
FIG. 11 is a graph illustrating a learning curve and the relationship between the cell stop duration and the number of visits to the cell, according to one embodiment of the present invention.

A learning curve model as shown in FIG. 11 may be expressed as:

$$T_j = T_1 j^{-l}$$

where:
 $T_j$ is the time to complete the jth attempt or cycle;
 $T_1$ is the time to complete the first cycle;
 j is the number of cumulative cycles; and
 l is the learning slope, which may be a constant for any particular situation.

When the number of cumulative cycles j is doubled, the time required will decreased at a constant rate known as a learning rate $\rho$). In mathematical terms:

because $T_n = T_1 n^{-l}$ and $T_{2n} = T_1 (2n)^{-l}$, $$\frac{T_{2n}}{T_n} = \frac{(2n)^{-l}}{n^{-l}} = 2^{-l} = \rho$$

and $l = -\log_2^\rho$.

Referring again to the learning curve model ($T_j = T_1 j^{-l}$): as the number of cycles of visits j increase, the time to complete each visit $T_j$ decreases and tends to approach a minimum lower limit called $T_f$. Applying the concept of learning rate $\rho$ and the lower limit $T_f$, a driver's learning curve may be expressed as:

$$T_j = \max\{T_1 j^{-l}, T_f\}$$

where:
 $T_j$ is the time needed per stop to complete the jth visit to the cell;
 $T_1$ is the standard time needed to service a stop without learning (i.e., the time needed to complete the first visit to a new cell);
 j is the number of cumulative visits; and
 l is the learning slope, which may be a constant for a particular situation. The learning slope l may be determined by the learning rate $\rho$.

To determine the time needed per stop $T_j$ in relation to the standard time $T_1$, divide both sides of the learning curve equation by $T_1$:

$$\frac{T_j}{T_1} = \max\left\{1 \cdot j^{-l}, \frac{T_f}{T_1}\right\}$$

If $T'_j = \frac{T_j}{T_1}, T_0 = 1$ and $T_\infty = \frac{T_f}{T_1}$, then $T'_j = \max\{T_0 \cdot j^{-l}, T_\infty\}$, where $T_j^i$ represents the percentage of the standard time $T_1$ a driver needs to service each stop on the jth visit to the cell. This equation also describes a learning curve, with the same learning slope, but with a different starting level and a learning limit $T_\infty$. The learning limit $T_\infty$ as shown in FIG. 11 reflects the efficiency gained in stop-to-stop traveling time when a driver has visited the cell enough times to develop maximum familiarity.

In addition to applying the driver learning model to the stops made within a cell, the model may also be used to analyze the travel time between stops, parcel handling at a single stop, and any other discrete task that improves as familiarity increases. For example, if a cell i is assigned to a core area, the average time that a driver spends on each stop within this cell $\tilde{T}_i$ should be:

$$\tilde{T}_i = T_\infty \cdot T_0 + T_\infty \cdot S_0$$

where $T_0$ is the beginning or standard traveling time per stop, and $S_0$ is the standard package handling time per stop. If $T_i = T_0 + S_0$, then $\tilde{T}_i = T_\infty \cdot T_i$.

5.2. Learning with Interruptions and Forgetting

At the operational level where routes will vary over time, the driver learning process may be interrupted when the driver does not visit a particular cell on a daily route. An interruption may cause a degree of forgetting about the cell that can be approximated. Like the learning curve phenomenon, a forgetting curve may describe the change in performance that occurs when a person ceases performing a task repetitively. The forgetting may be described as a variable regression of what was learned, toward an invariant level or limit of forgetting.

Figure 12:
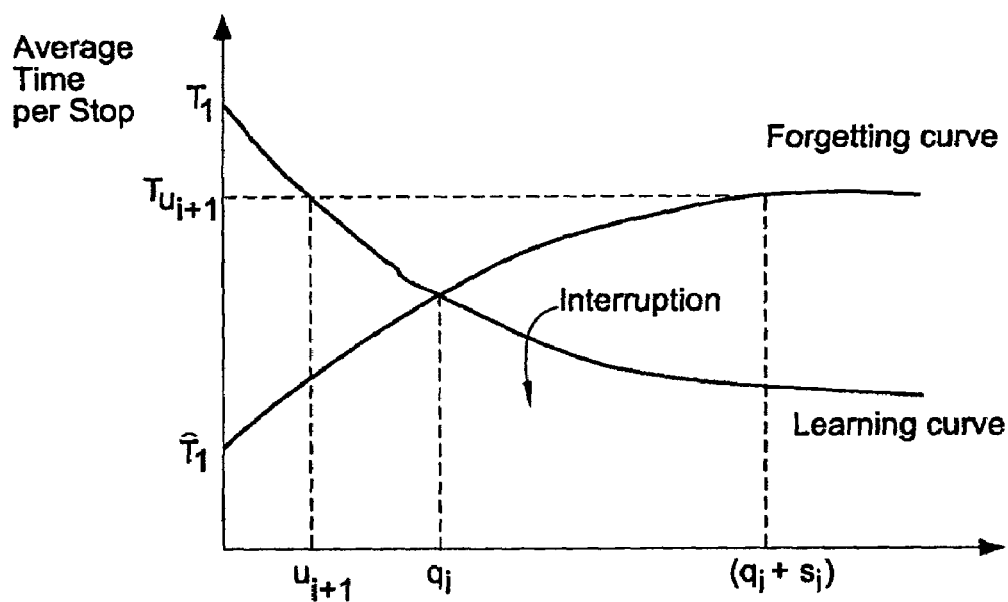
FIG. 12 is a graph illustrating both a learning curve and a forgetting curve, according to one embodiment of the present invention.

FIG. 12 illustrates both a learning curve and a forgetting curve, which may take similar forms. The forgetting curve may be expressed as:

$$\hat{T}_x = \hat{T}_1 x^f$$

where:

$\hat{T}_x$ is the time for the xth visit of lost experience;

$\hat{T}_1$ is the equivalent time per stop for the first lost experience;

x is the number of visits to the cell that would accumulate if interruption never occurred; and $f$ is the forgetting slope, which may be a constant for a particular situation. The value of the forgetting slope $f$ may depend on the forgetting rate.

By equating $\hat{T}_1$ (the time per stop required on the forgetting curve) to the average time per stop required to complete a service in the cell for the $q_i$ th visit on the learning curve, the equation becomes:

$$\hat{T}_1 = T_1 q_i^{-(1+f)}$$

where i=1 (for the first missed visit).

To analyze a finite gap or break period from visiting a particular cell, assume that after $q_i$ continuous visits, the learning process is interrupted for a period of time, during which, if there had been no interruption, an additional $s_i$ visits would have been made. The average time required to service a stop in the cell by the end of the break period on the forgetting curve would be:

$$\hat{T}_{q_i+s_i} = \hat{T}_1 (q_i+s_i)^f$$

As shown in FIG. 12, $u_{i+1}$ is the amount of equivalent visits remembered at the beginning of visit cycle (i+1), after the interruption in cycle i. Accordingly:

$$u_{i+1} = \left(\frac{\hat{T}_1}{T_1}(q_i+s_i)^f\right)^{-1/l}$$

The average time required to service a stop in the cell for the first visit after the break period in cycle i may be expressed as:

$$\hat{T}_{1,i+1} = T_1 (u_{i+1}+1)^{-l}$$

5.3. The Driver Learning Function

Figure 13:
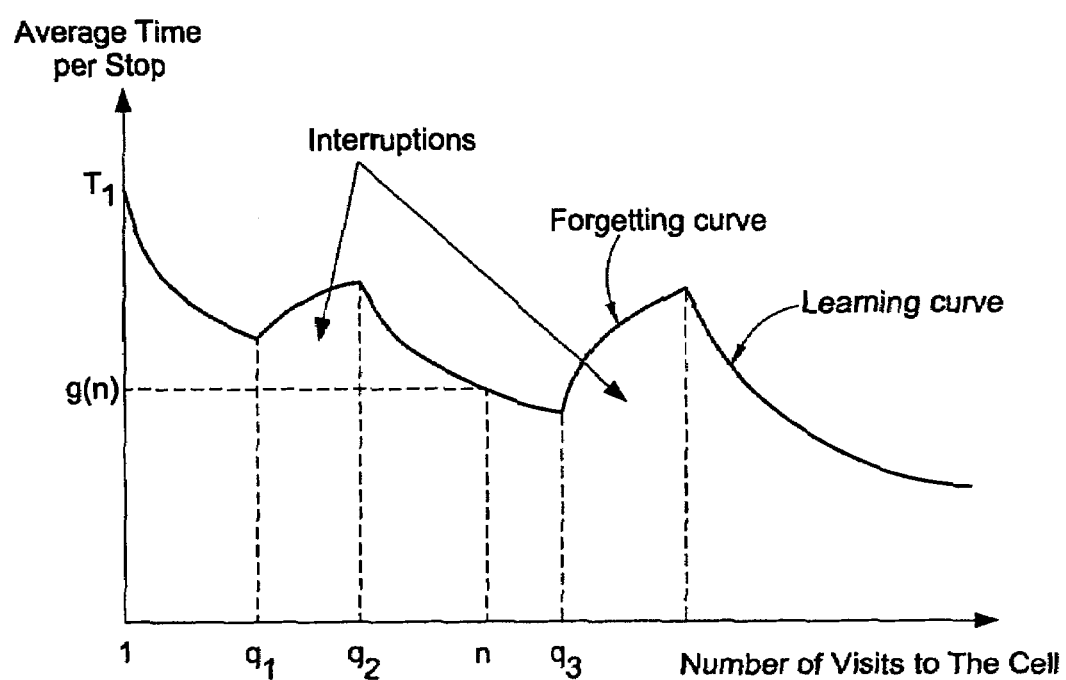
FIG. 13 is a graph illustrating a dynamic learning function, with periods of interruption and forgetting, according to one embodiment of the present invention.

In one embodiment of the present invention, a system may be used to store data describing the number of times a driver visits a particular cell. Using the equations discussed above, along with the stored visit data for each driver and each cell, a dynamic learning function may be constructed, as shown in FIG. 13. The function curve includes interruptions and forgetting g(n) as shown.

When the number of customers in cell (i, Di) is known, the total workload in terms of travel time and service time for a driver j can be expressed as:

$$f(n_i, D_i) = D_i g(n_i),$$

where $f(n_i, D_i)$ may be referred to as the Driver Learning Function.

The Driver Learning Function provides useful information at the operational level, where core cells and core areas are assigned to particular drivers. Using historical cell visit data and applying the Driver Learning Function, each driver's dynamic performance level relative to each cell may be calculated. The data may reveal, for example, that Driver Smith shows better performance than Driver Jones within cell i. In other words, the data may show that Driver Smith is more familiar with cell i than Driver Jones. Also, applying the workload calculations, Driver Smith would have a lower (and thus, more efficient) total expected workload when servicing cell i than Driver Jones. Cell i, therefore, would likely be assigned to Driver Smith, who is most familiar with cell i and can accomplish the service with less work.

5.4. Driver Performance and Visit Frequency

Planning routes involves predicting driver performance. Optimizing routes involves evaluating actual driver performance in comparison to the predicted performance.

Assume that a driver visits a cell according to a probability p. After a cell visit, driver performance will increase along the learning curve. When there is no cell visit, driver performance will decrease along the forgetting curve. Assume the learning slope l and the forgetting slope f are equivalent, such that 0<l=f<1. Assuming a current driver performance level of x, the expected subsequent driver performance level may be predicted to be:

$$p \cdot \max\left\{T_0 \cdot \left(\left(\frac{x}{T_0}\right)^{-\frac{1}{f}}+1\right)^{-f}, T_\infty\right\} + (1-p) \cdot \min\left\{T_\infty \cdot \left(\left(\frac{x}{T_\infty}\right)^{\frac{1}{f}}+1\right)^{f}, T_0\right\}$$

Assuming an overall expected driver performance level of $\hat{x}$ produces the following expression, referred to herein as Equation One:

$$p \cdot \max\left\{T_0 \cdot \left(\left(\frac{\hat{x}}{T_0}\right)^{-\frac{1}{f}} + 1\right)^{-f}, T_\infty\right\} +$$

$$(1-p) \cdot \min\left\{T_\infty \cdot \left(\left(\frac{\hat{x}}{T_\infty}\right)^{\frac{1}{f}} + 1\right)^{f}, T_0\right\} = \hat{x}$$

Defining the function, $f_0(x)$:

$$f_0(x) = p \cdot \max\left\{T_0 \cdot \left(\left(\frac{x}{T_0}\right)^{-\frac{1}{f}} + 1\right)^{-f}, T_\infty\right\} +$$

$$(1-p) \cdot \min\left\{T_\infty \cdot \left(\left(\frac{x}{T_\infty}\right)^{\frac{1}{f}} + 1\right)^{f}, T_0\right\} - x$$

If there exists a single solution when $f_0(x)=0$, then the solution represents the expected driver performance level given a visiting frequency of $\rho$.

To determine if the function value is decreasing while driver performance x is increasing, there are four scenarios to consider:

First Scenario:

$$T_0 \cdot \left(\left(\frac{x}{T_0}\right)^{-\frac{1}{f}} + 1\right)^{-f} \leq T_\infty \text{ and } T_\infty \cdot \left(\left(\frac{x}{T_\infty}\right)^{\frac{1}{f}} + 1\right)^{f} \geq T_0:$$

Now function $f_0(x)$ becomes:

$$f_1(x) = p \cdot T_\infty + (1-p) \cdot T_0 - x$$

and $f_1(x)<0$.

Second Scenario:

$$T_0 \cdot \left(\left(\frac{x}{T_0}\right)^{-\frac{1}{f}} + 1\right)^{-f} \leq T_\infty \text{ and } T_\infty \cdot \left(\left(\frac{x}{T_\infty}\right)^{\frac{1}{f}} + 1\right)^{f} < T_0$$

Now function $f_0(x)$ becomes:

$$f_2(x) = p \cdot T_\infty + (1-p) \cdot T_\infty \cdot \left(\left(\frac{x}{T_\infty}\right)^{\frac{1}{f}} + 1\right)^{f} - x$$

$$f_2'(x) = (1-p) \cdot T_\infty \cdot f \cdot \left(\left(\frac{x}{T_\infty}\right)^{\frac{1}{f}} + 1\right)^{f-1} \cdot \left(\frac{1}{f}\right) \cdot \left(\frac{x}{T_\infty}\right)^{\frac{1}{f}-1} \cdot \left(\frac{1}{T_\infty}\right) - 1 =$$

$$(1-p) \cdot \frac{\left(\left(\frac{x}{T_\infty}\right)^{\frac{1}{f}} + 1\right)^{f-1}}{\left(\left(\frac{x}{T_\infty}\right)^{\frac{1}{f}}\right)^{f-1}} - 1 =$$

$$(1-p) \cdot \frac{1}{\left(1 + \left(\frac{T_\infty}{x}\right)^{\frac{1}{f}}\right)^{1-f}} - 1 < (1-p) - 1 = -p < 0$$

Third Scenario:

$$T_0 \cdot \left(\left(\frac{x}{T_0}\right)^{-\frac{1}{f}} + 1\right)^{-f} > T_\infty \text{ and } T_\infty \cdot \left(\left(\frac{x}{T_\infty}\right)^{\frac{1}{f}} + 1\right)^{f} < T_0$$

Now function $f_0(x)$ becomes:

$$f_3(x) = p \cdot T_0 \cdot \left(\left(\frac{x}{T_0}\right)^{-\frac{1}{f}} + 1\right)^{-f} + (1-p) \cdot T_0 - x$$

and:

$$f_3'(x) = p \cdot T_0 \cdot (-f) \cdot \frac{\left(-\frac{1}{f}\right) \cdot \left(\frac{x}{T_0}\right)^{-\frac{1}{f}-1} \cdot \left(\frac{1}{T_0}\right)}{\left(\left(\frac{T_0}{x}\right)^{\frac{1}{f}} + 1\right)^{f+1}} - 1 =$$

$$p \cdot \frac{\left(\frac{x}{T_0}\right)^{-\frac{1}{f}-1}}{\left(\left(\frac{T_0}{x}\right)^{\frac{1}{f}} + 1\right)^{f+1}} - 1 = p \cdot \frac{1}{\left(\frac{x}{T_0}\right)^{\frac{1}{f}+1} \cdot \left(\left(\frac{T_0}{x}\right)^{\frac{1}{f}} + 1\right)^{f+1}} - 1 =$$

$$p \cdot \frac{1}{\left(\left(\frac{x}{T_0}\right)^{\frac{1}{f}}\right)^{f+1} \cdot \left(\left(\frac{T_0}{x}\right)^{\frac{1}{f}} + 1\right)^{f+1}} - 1 =$$

$$p \cdot \frac{1}{\left(1 + \left(\frac{x}{T_0}\right)^{\frac{1}{f}}\right)^{f+1}} - 1 < p - 1 < 0$$

Fourth Scenario:

$$T_0 \cdot \left(\left(\frac{x}{T_0}\right)^{-\frac{1}{f}} + 1\right)^{-f} > T_\infty \text{ and } T_\infty \cdot \left(\left(\frac{x}{T_\infty}\right)^{\frac{1}{f}} + 1\right)^{f} < T_0$$

Now function $f_0(x)$ becomes:

$$f_4(x) = p \cdot T_0 \cdot \left(\left(\frac{x}{T_0}\right)^{-\frac{1}{f}} + 1\right)^{-f} + (1-p) \cdot T_\infty \cdot \left(\left(\frac{x}{T_\infty}\right)^{\frac{1}{f}} + 1\right)^{f} - x$$

$$f'(x) = p \cdot T_0 \cdot (-f) \cdot \frac{\left(-\frac{1}{f}\right) \cdot \left(\frac{x}{T_0}\right)^{-\frac{1}{f}-1} \cdot \left(\frac{1}{T_0}\right)}{\left(\left(\frac{T_0}{x}\right)^{\frac{1}{f}} + 1\right)^{f+1}} +$$

$$(1-p) \cdot T_\infty \cdot f \cdot \left(\left(\frac{x}{T_\infty}\right)^{\frac{1}{f}} + 1\right)^{f-1} \cdot \left(\frac{1}{f}\right) \cdot \left(\frac{x}{T_\infty}\right)^{\frac{1}{f}-1} \cdot \left(\frac{1}{T_\infty}\right) - 1 =$$

$$p \cdot \frac{\left(\frac{x}{T_0}\right)^{-\frac{1}{f}-1}}{\left(\left(\frac{T_0}{x}\right)^{\frac{1}{f}} + 1\right)^{f+1}} + (1-p) \cdot \frac{\left(\left(\frac{x}{T_\infty}\right)^{\frac{1}{f}} + 1\right)^{f-1}}{\left(\frac{x}{T_\infty}\right)^{\frac{1}{f}-1}} - 1 =$$

$$p \cdot \frac{1}{\left(1 + \left(\frac{x}{T_0}\right)^{\frac{1}{f}}\right)^{f+1}} + (1-p) \cdot \frac{1}{\left(1 + \left(\frac{x}{T_\infty}\right)^{\frac{1}{f}}\right)^{1-f}} - 1 <$$

$$p + (1-p) - 1 = 0$$

Thus, the value of function $f_0(x)$ is decreasing as driver performance x is increasing. Also, $$f(T_0) = p \cdot T_0 \cdot 2^{-f} + (1-p) \cdot T_0 - T_0 = p \cdot T_0 \cdot (2^{-f} - 1) < 0$$

and $$f(T_\infty) = p \cdot T_\infty + (1-p) \cdot T_\infty \cdot 2^f - T_\infty > p \cdot T_\infty + (1-p) \cdot T_\infty - T_\infty = 0$$

which proves there exists a single x value that satisfies Equation One, where x is the expected driver performance level given a visit frequency of p.

In one embodiment, the present invention includes an efficient algorithm for solving Equation One. Understanding that function value $f_0(x)$ is decreasing, a solution algorithm in one embodiment includes a binary search method to look for the value of x that allows the function value $f_0(x)$ to decrease and approach zero.

Figure 14:
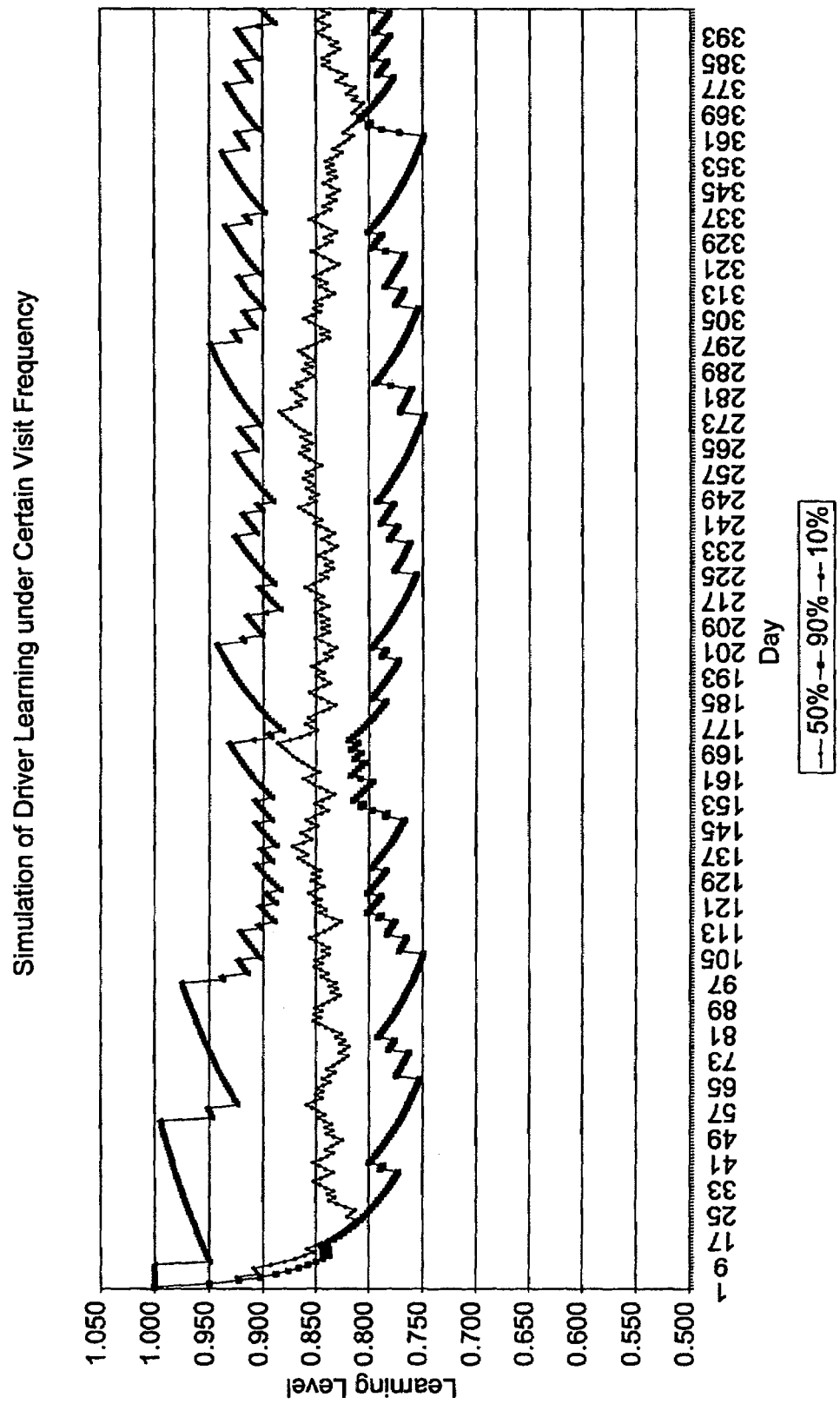
FIG. 14 is a graph illustrating the results of a simulated driver learning scenario using a set of variables and a method of solving a driver performance function, according to one embodiment of the present invention.
Figure 15:
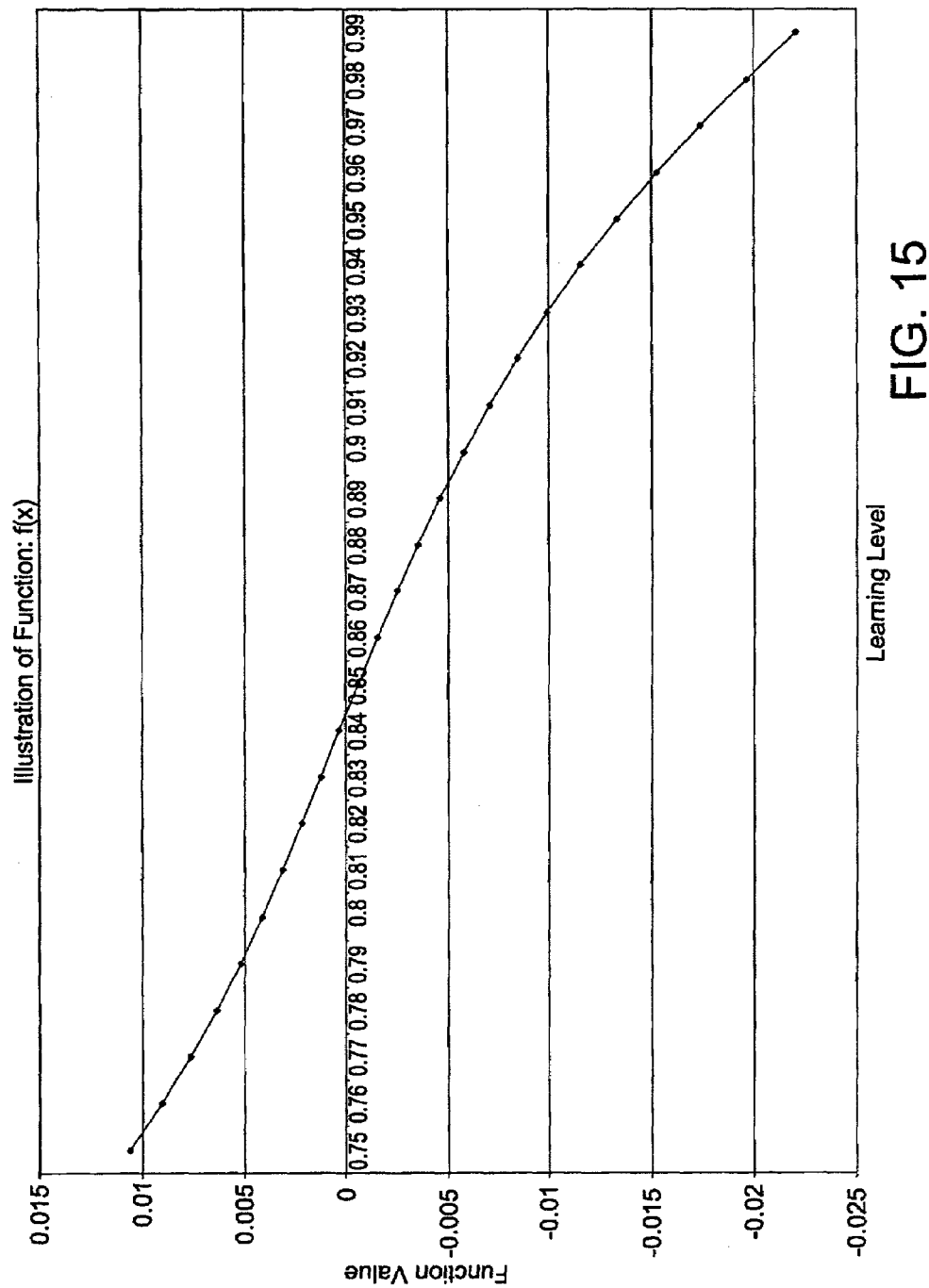
FIG. 15 is a graph illustrating the values obtained when solving a driver performance function, according to one embodiment of the present invention.

Applying this method of the present invention, an expected performance level w(p) was calculated based upon a visit frequency p of 50% (or 0.5), a first-visit learning level $T_0=1$ on day one, and a final learning level of 70% (or 0.7). The resulting learning curve is shown in FIG. 14. The corresponding shape of function $f_0(x)$ is shown in FIG. 15.

FIG. 14 also includes additional learning curves for visit frequencies p of 90% and 10%, respectively. The marked variation in learning level when the visit frequency p is lower confirms the qualitative notion that driver performance declines when driver learning is interrupted.

6. Route Consistency

The study and quantification of the value of driver familiarity confirms the intrinsic value of consistent delivery routes. A consistent route means that roughly the same geographical area is served by the same driver each day.

Consistent routes have both tangible and intangible benefits. A driver familiar with a route spends less time finding addresses and offices, and less time researching maps and directions. Better planning of stops along a consistent route will increase productivity; i.e., increase the number of stops and deliveries completed in a workday. Consistent routes also increase loading efficiency because the personnel who load the packages into the vehicles also learn the characteristics of a particular route. Driver familiarity along a consistent route also provides more personalized service to customers along the route.

6.1. Empirical Data and the Grid Method

Existing algorithms for solving a Vehicle Routing Problem (VRP) do not measure whether or how often a particular customer is visited by the same driver. In one embodiment of the present invention, route planning systems are disclosed that include driver consistency in the context of solving a particular type of VRP.

Figure 16:
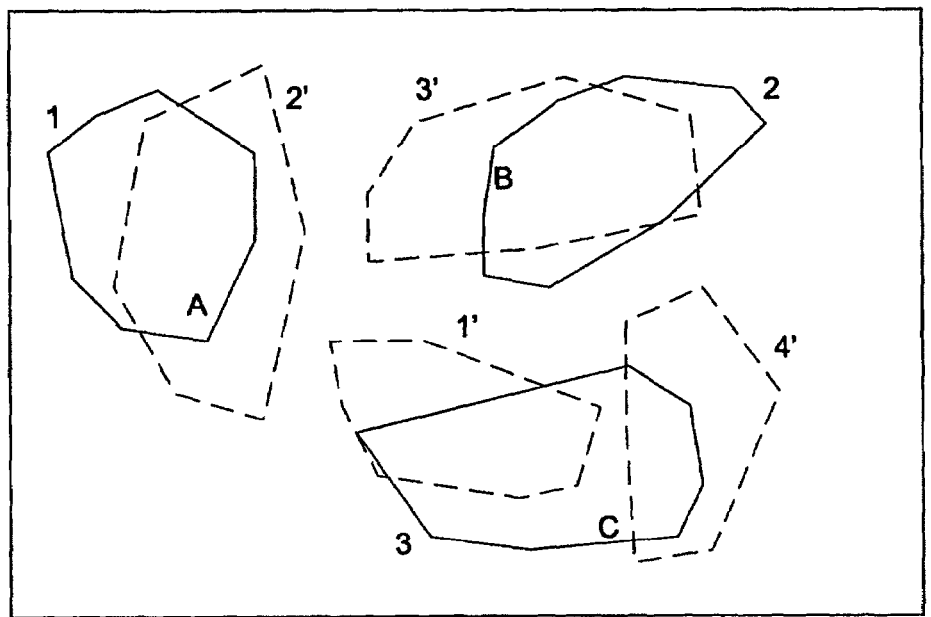
FIG. 16 is an illustration of part of a service territory in plan view, showing the convex hulls of a series of daily routes, according to one embodiment of the present invention.

FIG. 16 is an illustration of part of a service territory 20 in plan view, showing three routes 1, 2, and 3, assigned to three specific drivers A, B, and C, respectively, on a first day. Instead of showing each and every stop along each route in FIG. 16, each route is represented by its convex hull. The convex hull of a set of points is defined as the smallest convex polygon that encloses all points in the set. The convex hulls for routes 1, 2, 3 are shown using solid lines.

The dotted lines represent a set of new routes 1', 2', 3', 4' on a second or subsequent day. Each route 1', 2', 3', 4' must be assigned to one of the drivers A, B, C. The problem solved by one embodiment of the present invention is to assign the routes while maintaining driver consistency as much as possible, and while considering the known constraints of the number and capacity of the vehicles, the number of drivers, and the hours available in a work day.

In one embodiment, the route planning system 10 of the present invention solves this problem by selecting a reference day on which the minimum number of drivers is available. Each driver is assigned a route on the reference day. For subsequent days, an attempt is first made to assign the same driver to the new route that has the most amount of territory overlap with the assigned route. The following steps illustrate an embodiment of a driver route assignment method:

(1) Execute a route planning algorithm over the service territory 20 for each day during a reference period.
   (a) Determine the number of assigned routes needed for each day during the reference period. The number of assigned routes equals the number of drivers needed.
   (b) Find the minimum number of drivers (i.e., the base staff) needed during any single day (or days) during the reference period.
(2) Select as a reference day any single day during the reference period on which only the base staff was needed. The solution of the route planning algorithm for the reference day produces an assigned route plan comprising a number of assigned routes equal to the number of base staff. Each assigned route has an assigned driver.
(3) Compare a current day to the reference day. The route planning algorithm run for the current day produces a plurality of unassigned routes.
   (a) For each of the assigned routes on the reference day:
     (i) find the one of the plurality of unassigned routes for the current day which has the maximum geographic overlap with the assigned route, wherein the geographic overlap is determined by calculating the area of the intersection between the convex hull of the assigned route and the convex hull of the unassigned route; and
     (ii) assign the unassigned route to the assigned driver.
   (b) Assign an additional driver to any unassigned routes remaining after each of the number of assigned routes has an assigned driver. In other words, additional drivers available on the current day will serve the remaining unassigned routes.

Other methods for assigning routes and drivers are disclosed herein, including the following grid method.

6.1.1. The Grid Method for Measuring Route Consistency

Figure 4:
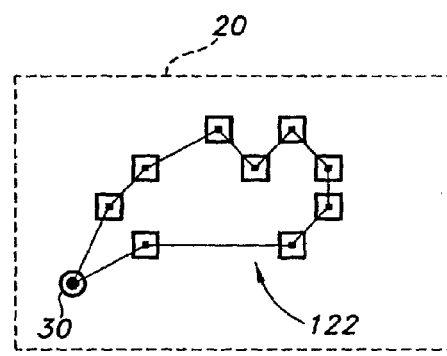
FIG. 4 is an illustration of a delivery route traveled on a different day by the same driver, according to one embodiment of the present invention.
Figure 3A:
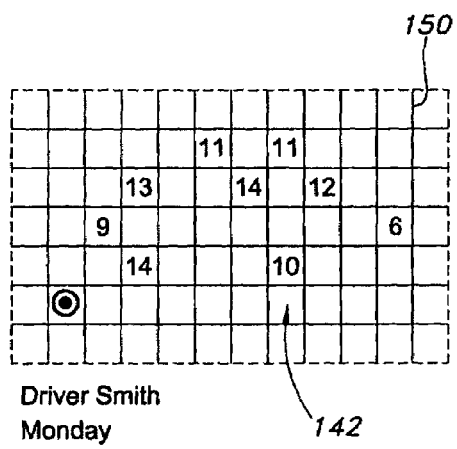
FIG. 3A is a graphical illustration of a grid superimposed on the route illustrated in FIG. 3, according to one embodiment of the present invention.
Figure 4A:
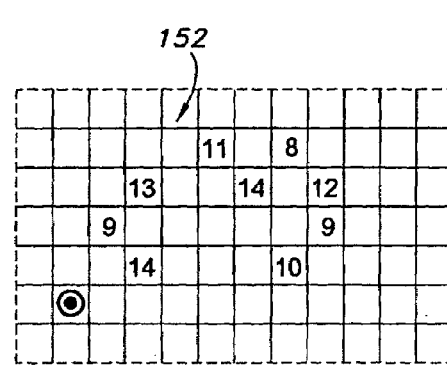
FIG. 4A is a graphical illustration of a grid superimposed on the route illustrated in FIG. 4, according to one embodiment of the present invention.

In one embodiment, the present invention provides a method for measuring route consistency within a service territory. As shown in FIGS. 3A and 4A, the service territory 20 may be been divided into segments using a grid 150.

Figure 3:
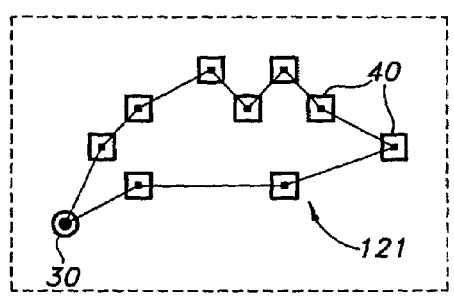
FIG. 3 is an illustration of a delivery route traveled on a single day by a driver, according to one embodiment of the present invention.

The grid method is illustrated beginning with FIG. 3, which depicts an exemplary first daily route 121 assigned to a first driver 23 (Driver Smith) on a day (Monday) during a reference period. The route 121 may represent one of the routes within the convex hull B illustrated in FIG. 16. In this context, the following steps illustrate an embodiment of a grid method.

(1) A first step may include dividing the service territory 20 or a portion thereof into a plurality of grid segments 152 using a grid 150. The grid 150 may be take any shape and may include grid segments 152 of any size or shape, including random shapes and including various sizes and shapes within the same grid 150. Empirical data, experience, and historical route data may assist a route planner when imposing a grid 150 upon a particular area. A symmetrical and rectilinear grid 150 is shown in FIG. 3A by way of example and not limitation. Note the grid 150 in FIG. 3A has been superimposed upon the first daily route 121 shown in FIG. 3, such that each cell 40 is represented by a corresponding grid segment 152. In a real operational setting, the grid segments 152 need not coincide with the cells 40. In fact, a grid segment 152 may encompass several cells 40, only a portion of a cell or cells, or no active cells at all. The grid shape depends on the particular characteristics of a service territory 20 or portion thereof and the peculiarities of the routes.

(2) The following steps may be executed for each grid segment 152, for each day during a reference period, and for each assigned driver. It may be appreciated by one skilled in the art that storing the following data in a database or other type of data store on a computer may facilitate the comparisons, calculations, and other uses described for the data. In one embodiment of the present invention, the methods and systems disclosed impliedly include a method of gathering, tracking, storing, and retrieving empirical data from each element in a route planning system, including but not limited to the hubs, route plans, discrete routes, route stops, cells, sub-routes within cells, sub-route stops, parcels, as well as the drivers, vehicles, and related systems involved in accomplishing deliveries. The grid method may be formulated for execution by a computer system. In one embodiment, an array or matrix may be used to categorize and easily reference the data regarding each grid segment 152, for each day during a reference period, and for each assigned driver, in the following steps:

(a) Compare the number of stops within each grid segment 152 (referred to as grid stops) to the number of total stops along the assigned route for each driver. In FIG. 3A, the number of grid stops is shown as a numeral within each grid segment 152 and corresponds to the cells 40 shown in FIG. 3. The comparison of grid stops to total stops may be expressed as a percentage. For mathematical simplicity, the number of total stops in FIG. 3A equals one hundred.

(b) Repeat the comparison described in step (a) for each day during a reference period. A second daily route 122 with different cell locations is shown in FIG. 4. The second daily route 122 is assigned to the first driver 23 (Driver Smith) on a subsequent day (Tuesday) during a reference period. In FIG. 4A, the number of grid stops is shown as a numeral within each grid segment 152 and corresponds to the cells 40 shown in FIG. 4. Again, for mathematical simplicity, the number of total stops in FIG. 4A equals one hundred.

Figure 5:
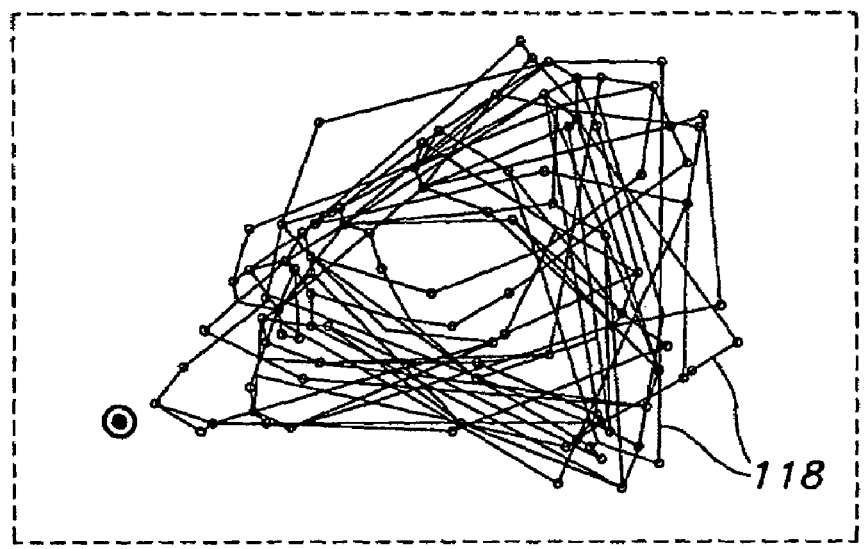
FIG. 5 is an illustration of a set of daily delivery routes during a reference period by the same driver, according to one embodiment of the present invention.
Figure 5A:
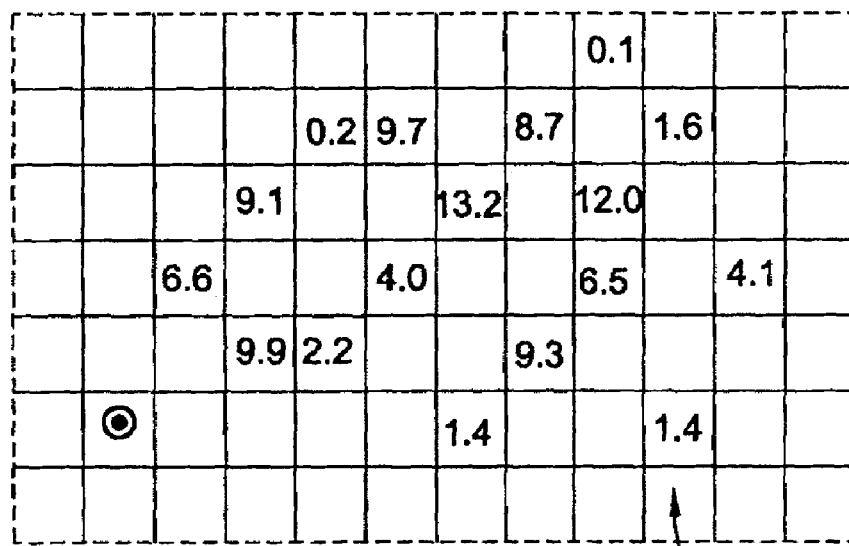
FIG. 5A is a graphical illustration of a grid superimposed on the set of daily routes illustrated in FIG. 5, according to one embodiment of the present invention.

(3) An exemplary compilation of the plurality of daily routes 118 actually driven by the first driver 23 during an entire reference period is shown in FIG. 5. In this step, for each driver, over all the days in the reference period, compare the average number of grid stops to the average total number of stops. This comparison is referred to as the grid segment visiting frequency 154 and it may be expressed as a percentage. The grid segment visiting frequency 154 for the first driver 23 only is shown in FIG. 5A. Similar data may be calculated for each driver who serviced a route during the reference period.

(4) Compare the grid segment visiting frequency 154 across the service territory 20 for each driver. In real operating conditions, a grid 150 similar to that shown in FIG. 5A may be produced for each driver on a staff. Then, for each grid segment 152, identify the driver who has the highest grid segment visiting frequency 154 and assign this most frequent driver to service that grid segment 152 on a continuing basis. In other words, assign the most frequent driver to each grid segment 152.

(5) Finally, to understand the pattern of visits across the service territory 20, a grid consistency index for each grid segment 152 may be calculated by averaging all the grid segment visiting frequencies 154 of all the drivers. A map of the service territory 20 showing the grid consistency index for each grid segment 152 may facilitate the identification of those geographical areas that are most often serviced by a consistent driver. Thus, the grid consistency index provides a measure of route consistency.

In another aspect of the grid method, the grid consistency index may form the basis of a Core Area Route Design model, as described below.

6.2. A Mathematical Model for Route Consistency

In one embodiment, the present invention provides a method for measuring route consistency within a service territory using a mathematical model. There exists an opposing tension between route consistency and optimal route planning because route optimization requires flexibility (as opposed to consistency). The value of route flexibility at the individual cell level is derived from the ability of the inventive system to assign the cell to any one driver at a nearly equal cost. Until the development of the methods and systems disclosed herein, the cost of assigning a driver has not included the value of driver familiarity.

In one embodiment of the system, each cell 40 in a service territory 20 may be classified as a core cell 60, a flex zone cell 50 (discussed below), or a daily cell 70 (i.e., unclassified or, in other words, assigned on a daily basis only). Core cells 60 may be grouped into a core area 100. An example of such a cell classification is depicted in FIGS. 7 through 10.

In a mathematical model of the present invention, all unassigned cells are assigned to a dummy core area zero. Let $I_{ik}$ represent the assignment that assigns cell i to core area k. Then the total time associated with assignment $I_{ik}$ is:

$$f_{ik} = g_{ik} + h_{ik}$$

where:

$g_{ik}$=the total travel time it takes the driver who is serving this core cell to complete the workload within the cell; and $h_{ik}$=the total cell-to-cell travel time contribution of assignment $I_{ik}$ in the optimal cell tour that includes core area k.

An objective is to minimize the expected total durations associated with the assignments of cells to core areas 100, under the probabilistic constraints that limit the probability that the sum of a workload within each core area 100 will exceed the maximum workday duration of drivers. Accordingly, the following mathematical model was developed:

$$\text{Min } E\left[\sum_{i,k} f_{ik} I_{ik}\right] \quad (1')$$

$$\text{S.t. } \sum_{k} I_{ik} = 1, \quad (2')$$

$$i = 1, 2, \ldots, n$$
$$k = 0, 1, \ldots m$$

$$P\left(\sum_{i,k} f_{ik} I_{ik} \leq Q_k\right) \geq 1 - \alpha, \quad (3')$$

$$(k = 1, \ldots, m)$$

$$I_{ik} = 0 \text{ or } 1, \quad (4')$$
$$i = 1, 2, \ldots, n$$
$$k = 0, 1, \ldots m$$

where the decision variables of the model are the following integer variables:

$$I_{ik} = \begin{cases} 1 & \text{if cell } i \text{ is assigned to core area } k \\ 0 & \text{otherwise} \end{cases}$$

In the mathematical model, $Q_i$ is the maximum workday duration for driver i and α is the threshold probability that the total workload in each core area is less than the driver's maximum workday duration.

The functions $g_{ik}$ and $h_{ik}$ are extremely complicated and may be too difficult to write for non-trivial problems. In one aspect, the method of the present invention uses linear approximations of $g_{ik}$ and $h_{ik}$:

$$g_{ik} = \rho_{ik} T_i \xi_i$$

$$h_{ik} = \rho_{ik} C_{ik}$$

where:

$\rho_{ik}$ is the learning curve factor of driver k in cell i;

$T_i$ is the standard average time needed to serve a single stop in cell i;

$\mu_i$ is the mean demand in cell i;

$C_{ik}$ is the assignment cost of assigning cell i to core area k (in terms of cell-to-cell travel time in an optimal cell tour).

The value of consistency or familiarity is reflected in the parameter $\rho_{ik}$. If the driver is more familiar with a cell, less time is needed to finish the work and less time is needed to travel from cell to cell along the route.

Unassigned cells are assigned to a dummy core area zero; in other words, k=0. For a cell i that is assigned to a core area k, k is non-zero: k≠0.

For assigned cells, when k≠0, the learning factor $\rho_{ik}$ is a pre-defined value equal to the learning limit of driver k in cell i. It may be assumed that the learning limit is identical for all assigned cells.

The cell-to-cell travel time part of assignment cost is estimated as the follow:

$$C_{ik} = d_{ik} + d_{i0} - d_{ok}$$

where:

$d_{ik}$=Expected travel time from cell i to the seed point of core area k;

$d_{i0}$=Expected travel time from cell i to the depot; and $d_{ok}$=Expected travel time from depot to seed point of core area k.

For unassigned cells (i.e., when k=0) the value of route flexibility, in one aspect of the present inventive system, may be measured using the concept of visiting frequency. A cell that is not assigned nevertheless must be assigned on a temporary daily basis when a delivery to a customer in that area is required. For example, a delivery to an unassigned cell i may be temporarily assigned to core area k. The probability or frequency of this type of daily cell assignment may be referred to as $F_{ik}$. Such a delivery has an expected driver learning curve factor, $w(F_{ik})$. Accordingly, the expected learning curve factor for this delivery to cell i may be expressed as:

$$\rho_{i0} = \sum_{1}^{m} F_{ik} w(F_{ik}).$$

This equation demonstrates that, if a cell is split by several drivers in a daily route plan, the expected learning curve factor will be greater than that for a cell that is assigned to a core area on an ongoing basis. Accordingly, there is less learning benefit from unassigned cells in the core area building process.

However, unassigned cells in the daily dispatching stage provide more freedom for the dispatch system to balance the workload and optimally construct daily routes. In one embodiment, the present invention provides a method of indirectly estimating the value of this route flexibility in the following expression for calculating the expected cell-to-cell travel time contribution CiO of cell i in the optimal delivery route or cell tour:

$$C_{i0} = \left(\frac{d_{ib_2} - d_{ib_1}}{d_{ib_2}}\right) \cdot (F_{ib_1} C_{ib_1} + F_{ib_2} C_{ib_2}) + \frac{d_{i0}}{\bar{d}_{b0}} F_{i0} \cdot d_{i0}$$

where real core areas are ranked by the increasing distance from the cell i and coordinates $(b_1, b_2)$ represent the index of the core area with the best rank and the second-best rank. By simplifying the possible assignment of cells, in which a cell may be assigned only to core area $(b_1, b_2)$ and core area zero (i.e., assigned to other core areas), $$\bar{d}_{b0} = \frac{d_{b_1 0} + d_{b_2 0}}{2}.$$

$F_{ib_1}$, $F_{ib_2}$ and $F_{i0}$ are assigned value according to the weights of $d_{ib_1}$, $d_{ib_2}$ and $d_{i0}$. This function allows flexibility in two dimensions: (1) toward the depot; and (2) toward parallel drivers. The closer to the depot and the more equally positioned between two adjacent drivers, the more flexibility a cell may have. In the definition of $C_{i0}$, $$\left(\frac{d_{ib_2} - d_{ib_1}}{d_{ib_2}}\right) \text{ and } \frac{d_{i0}}{\bar{d}_{b0}}$$

serve as the flexibility coefficients for the two dimensions, respectively. Cells located a nearly-equal distance from the two closest core areas and cells near the hub or depot will have a smaller value of $C_{i0}$, which demonstrates those cells offer a higher value in terms of route flexibility. Accordingly, the function described provides an indirect approximation of the value of route flexibility.

For consistency, the expression for the learning curve factor $\rho_{i0}$ may be modified so that:

$$\rho_{i0} = F_{ib_1} w(F_{ib_1}) + F_{ib_2} w(F_{ib_2}) + F_{i0} w(F_{i0})$$

which demonstrates mathematically that a cell assigned to a core area yields a measurable benefit in terms of the learning curve factor $\rho_{ik}$. Conversely, as shown above in the expression for the cell-to-cell travel time contribution $C_{i0}$, an unassigned cell yields a measurable benefit in terms of route flexibility.

7. Core Area Route Design Models

Figure 8:
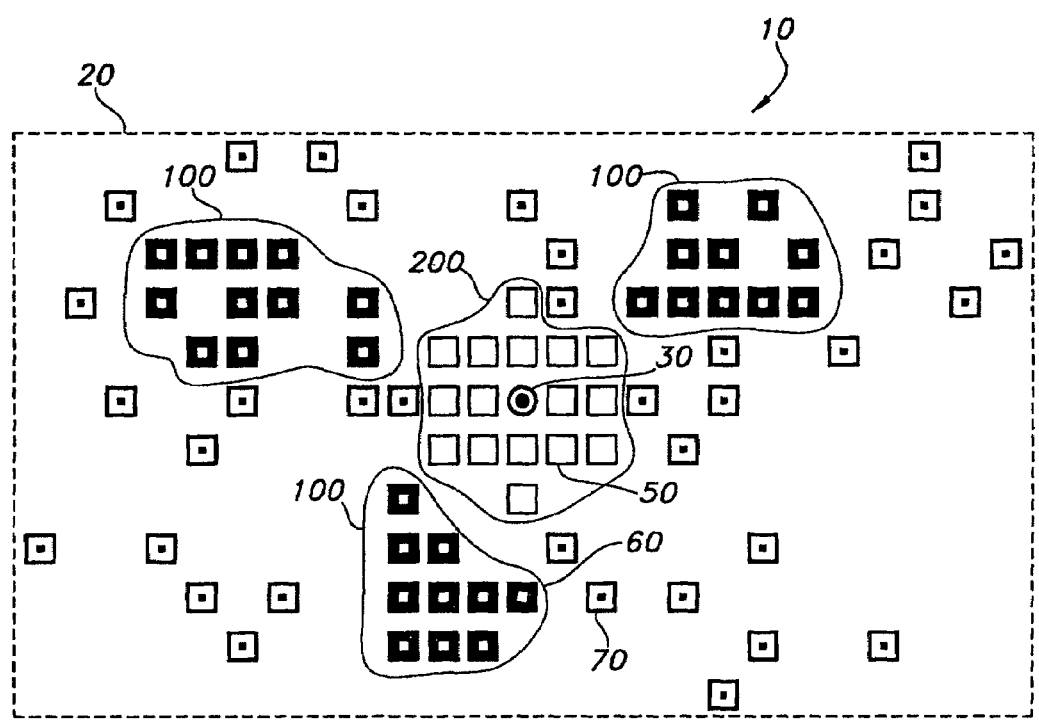
FIG. 8 is an illustration of a flexible service area near a hub and a plurality of outlying core cells, according to one embodiment of the present invention.

The methods and systems disclosed herein provide the tools for constructing a daily route plan for a service territory based on historical route data and the current daily demand. In one embodiment, as shown in FIG. 8, each cell 40 in a service territory 20 may be classified as a core cell 60, a flex zone cell 50, or a daily cell 70. Core cells 60 may be grouped together into a core area 100. The concept of using core areas 100 in a route planning process is an element of the present invention.

To construct the most efficient and effective core areas 100 for route planning purposes, in embodiments of the present invention, several models were developed for completing and optimizing a Core Area Route Design. Among the models disclosed herein are the Visit Frequency Limit model and the Stochastic Programming model.

7.1. The Visit Frequency Limit Model

Figure 6:
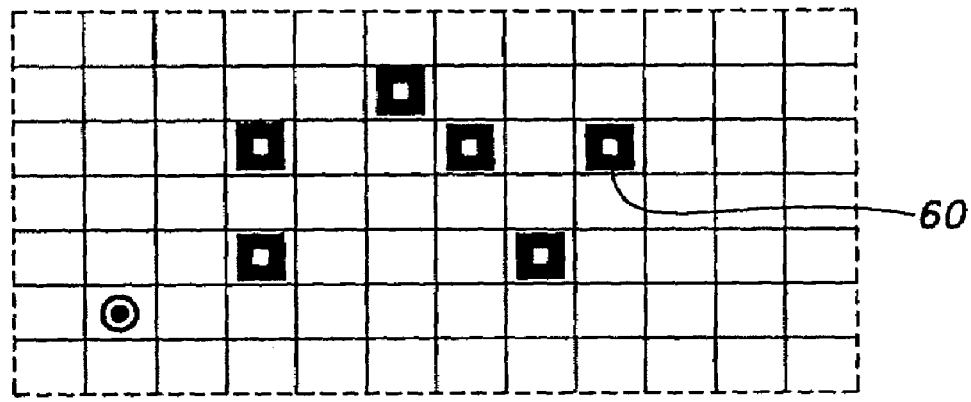
FIG. 6 is an illustration of a set of cells assigned to a delivery route, according to one embodiment of the present invention.
Figure 7:
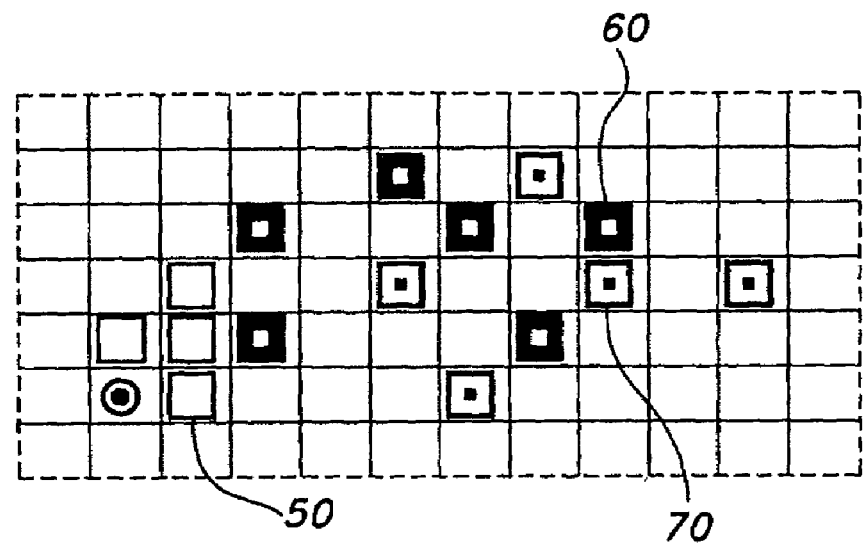
FIG. 7 is an illustration of additional cell assignments relative to those illustrated in FIG. 6, according to one embodiment of the present invention.

Referring again to the grid segment visiting frequency 154 for a first driver 23 as depicted in FIG. 5A, recall that a grid consistency index for each grid segment 152 may be calculated by averaging all the grid segment visiting frequencies 154 of all the drivers. The Visit Frequency Limit model of the present invention may use the grid consistency index to identify those geographical areas that are most often serviced by a consistent driver and, thus, most suitable for classification as a core cell 60, as shown in FIG. 6. Additional cell classifications are shown in FIG. 7, including flex zone cells 50 and daily cells 70.

Figure 22:
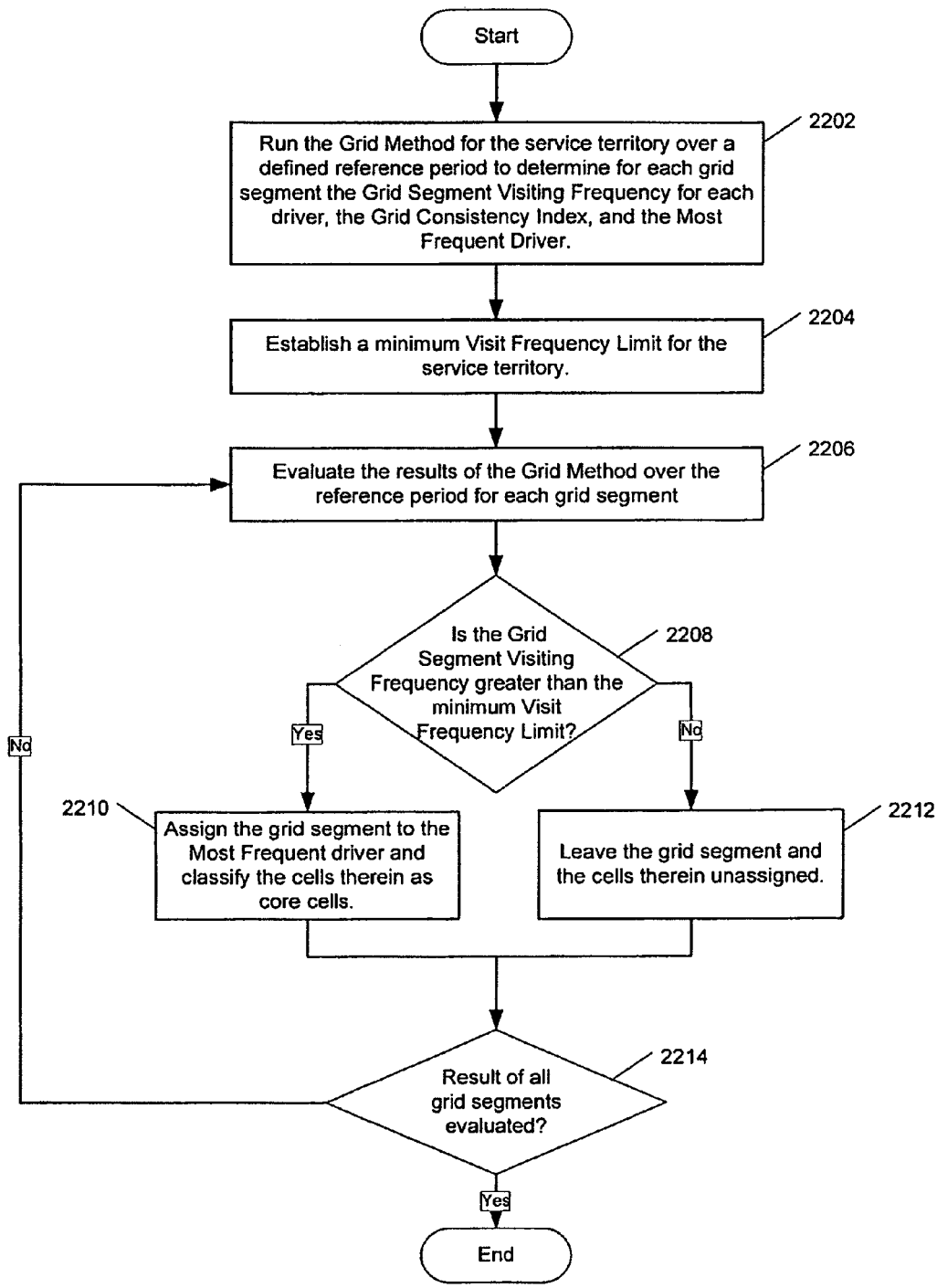
FIG. 22 is an illustration of the Visit Frequency Limit Model of Core Area Route Design, according to one embodiment of the present invention.

Referring now to a route planning system 10 shown in FIG. 8, the present invention in another aspect includes a method of designing the core areas 100 which is referred to as the Visit Frequency Limit model. The following steps illustrate an embodiment of the Visit Frequency Limit model as shown in FIG. 22:

(1) A first step may include the execution of a route planning algorithm over a number of days during a reference period on a known data set. As in the Grid Method described above, a database may be used to categorize and easily reference the daily data for each driver.

(2) Run the Grid Method for measuring route consistency, as described above. The results may include a grid segment visiting frequency 154 for each driver 23, a grid consistency index for each grid segment 152 in the service territory 20 or portion thereof, and the identity of the most frequent driver for each grid segment, as shown in step 2202.

(3) Establish a minimum Visit Frequency Limit for the service territory, to use as the basis for deciding whether a grid segment may be classified as a core cell or placed in a core area, as shown in step 2204.

(4) As shown in step 2210, assign the most frequent driver to service the entire grid segment 152 on an ongoing basis if the grid segment visiting frequency 154 for the most frequent driver is greater than the minimum Visit Frequency Limit, as determined in step 2208. A grid segment 152 may include one or more cells 40. When a grid segment 152 is assigned to a most frequent driver, the cells 40 therein may be classified as core cells 60. In this aspect, the method of assigning grid segments also accomplishes the task of classifying cells as core cells.

(5) If the criterion of step (4) is not met, the grid segment 152 and the cells 40 therein remain unassigned, as shown in step 2212.

Figure 9:
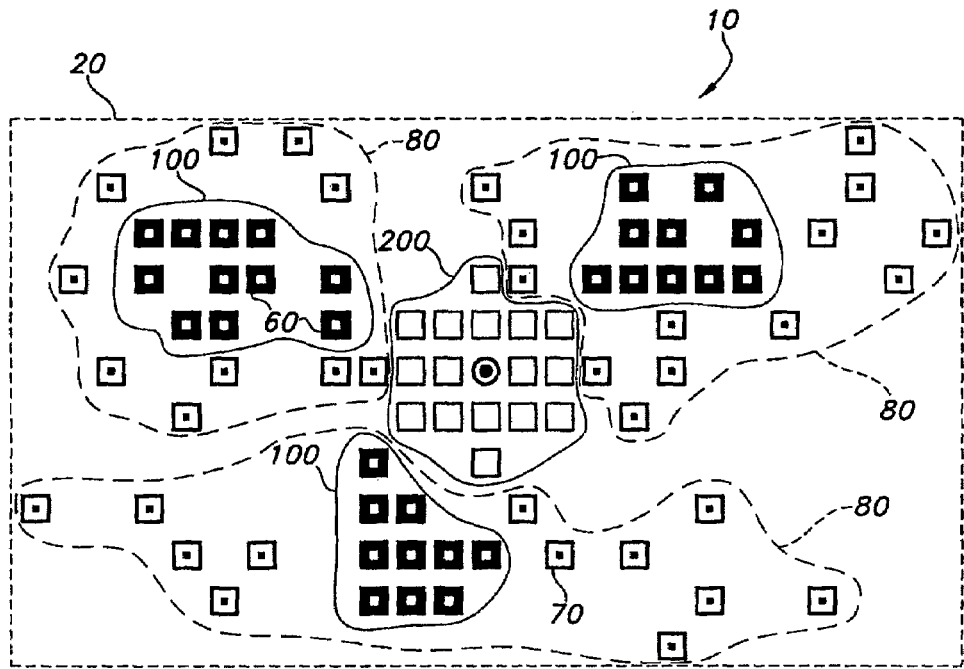
FIG. 9 is an illustration of a set of first exemplary delivery areas for a particular day within the service territory, according to one embodiment of the present invention.

FIG. 9 is an illustration of a group of core areas 100 containing core cells 60 and/or grid segments 152 assigned to a most frequent driver using the Visit Frequency Limit model. FIG. 9 also shows a set of first exemplary delivery areas 80 within a service territory 20. Cells assigned on an ongoing basis to a core area 100 are referred to as core cells 60. Typically, one core area 100 is assigned to each available driver.

When service is requested by a customer located in an unassigned cell, the cell must be assigned on a daily basis to an available driver. Cells assigned on a daily basis are referred to as daily cells 70. As shown in FIG. 9, the first exemplary delivery areas 80 include a number of daily cells 70. At the operational level, daily cells 70 are generally assigned to the driver who serves the nearest core area 100. In one embodiment of the present invention, daily cells 70 may be optimally assigned to one extra driver by running a modified route planning algorithm specifically tailored to assign daily cells 70.

In one embodiment, a method of the present invention includes establishing a proximity factor relating each daily cell 70 to each core area 100. The proximity factor may include a distance element, a time element, or any additional element relevant to selecting the best core area 100 to accept the daily cell 70.

An individual stop 42 located outside a core cell 100, a flex zone cell 50, or a daily cell 70 may be referred to as a daily stop. In one embodiment, a method of the present invention includes establishing a stop proximity factor relating each daily stop to each core area 100. The stop proximity factor may include a distance element, a time element, or any additional element relevant to selecting the best core area 100 to accept the daily stop location.

In a related aspect of the invention, the Visit Frequency Limit model may be applied to existing route plans, such as cluster-based or loop-based plans, to preserve any route consistency already achieved within an active service territory. More specifically, the model may be applied to an existing loop route to evaluate its consistency and efficiency.

It should be understood that the design methodologies disclosed herein are scalable. The methods and systems of the present invention may be applied on a nationwide basis to evaluate routes across large clusters within a national service territory, on a neighborhood basis to evaluate route plans through particular streets within a portion of a cell, or on a stop-by-stop basis to evaluate parcel handling during a stop. Furthermore, the types of segmented areas and grids disclosed herein are used for descriptive purposes, as a way of illustrating the applications, and should not be construed as a limitation on the applicability or suitability for use on different shapes. In fact, it will be appreciated by those skilled in the art that the formulae and analyses disclosed herein may be mathematically and conceptually applied to any variety of discrete shapes and sizes.

7.2. The Stochastic Programming Model

In another embodiment of the present invention, a mathematical model for constructing optimal core areas for route planning purposes. In the Stochastic Programming model, a set of optimal core areas is identified by solving a Non-linear Generalized Assignment Program (NGAP) with the objective of maximizing the savings produced by driver familiarity and minimizing the assignment cost associated with assigning a cell to a core area.

By identifying core areas at a strategic level, a good framework of driver service territories is established, which is essential for making consistent route plans while at the same time leaving enough flexibility to accommodate the varying customer demand, which in turn results in better driver utilization. In one embodiment, an effective meta-heuristic (tabu search) method was developed for clustering cells into core areas.

One of the constraints in this model is that the probability that the total workload in the core area may exceed the workday duration of the driver. Workday duration will be used as a threshold to analyze how the size of a core area may affect the total routing cost.

In one embodiment, a stochastic Core Area Design model is provided which considers the stochastic customer locations and demands. By optimally partitioning a service territory, the stochastic model maximizes the benefits from driver familiarity by producing more consistency in the daily operational vehicle dispatching plan, while at the same time allowing enough flexibility to produce optimal or near-optimal daily routes.

If a cell is assigned to a core area, the total travel time a driver needs to serve all the stops within this cell will decrease to the proportion $\rho = T_\infty$ ($0 < \rho < 1$), which may be referred to as a learning curve factor $\rho$.

$T_\infty$ is the driver learning limit in terms of the percentage of standard average time used to serve a stop within a cell or travel from cell to cell. Obviously, it is advantageous to assign as many cells to the core area as feasible. However, there are two limiting factors:

The workload for a route should rarely exceed shift duration. This limits the threshold probability that the workload within a core area exceeds the total work duration (say, within 5%). The larger this threshold, the more likely that the core area will generate a route with overage in terms of total route duration.

In one embodiment, the method of the present invention includes a primal stochastic program formulated to accomplish the stochastic Core Area Design model. The decision variables of the model are the following integer variables:

$$I_{ik} = \begin{cases} 1 & \text{if cell } i \text{ is assigned to core area } k \\ 0 & \text{otherwise} \end{cases}$$

Parameters of the model are as follows:

$C_{ik}$ = The assignment cost of assigning cell i to core area k
$\rho_{ik}$ = Learning curve factor of cell i for driver k
$T_i$ = Standard average time needed to serve a single stop in cell i
$Q_i$ = Maximum working duration for driver i
$\mu_i$ = Mean demand in cell i
$\delta_i$ = Standard deviation of demand in cell i
$\xi_i$ = Numbers of Customer in cell i (random variable)
$\alpha$ = Threshold which is the probability that the total workload in each core area is less than maximum working duration.

The stochastic programming model can be formulated as follows:

$$\text{Min } E\left[\sum_{i,k} \rho_{ik} T_i \xi_i I_{ik} + \sum_{i,k} \rho_{ik} C_{ik} I_{ik}\right] \quad (1)$$

$$\text{S.t. } \sum_k I_{ik} = 1, \quad \begin{aligned} i &= 1, 2, \ldots, n \\ k &= 0, 1, \ldots m \end{aligned} \quad (2)$$

$$P\left(\sum_i (\rho_{ik} T_i \xi_i I_{ik} + \rho_{ik} C_{ik}) I_{ik} \leq Q_k\right) \geq 1 - \alpha, (k = 1, \ldots, m) \quad (3)$$

$$I_{ik} = 0 \text{ or } 1, \quad \begin{aligned} i &= 1, 2, \ldots, n \\ k &= 0, 1, \ldots m \end{aligned} \quad (4)$$

The objective function in Equation (1) represents the sum of the costs incurred from by assigning a cell to a core area (including a dummy core area zero). $\rho_{ik} T_i \xi_i$ in the objective function represents the learning-adjusted workload within the cell (including stop to stop traveling time and service time at each stop) by assigning it to core area due to driver familiarity with their service territories. $\rho_{ik} C_{ik}$ represents the contribution of learning-adjusted cell to cell traveling time in the optimal cell tour based on the cell assignment.

Equation (2) ensures that each cell is assigned to only one core area.

Equation (3) contains the probability constraints for working duration of each core area. It states that the probability that the total workload in each core area exceeds the maximum working duration of the driver can not be higher than $\alpha$.

7.3. Flex Zones

In one embodiment, the Core Area Design models of the present invention include a method of constructing a flex zone 200, which is a flexible service area generally located around the depot or hub 30. This zone has the most flexibility because work can be assigned to alternate drivers without incurring a large change in total routing cost. The size of this flex zone is decided by the variability of the customer demand. FIG. 8 illustrates a flex zone 200, which may contain one or more flex zone cells 50.

The establishment of a flex zone 200 effectively removes the flex zone cells 50 from the calculation process which, in turn, simplifies and speeds the process of building core areas using the models of the present invention. The flex zone 200 may take any shape and may vary over time, as customer demand changes. In some plans, the hub 30 may be located outside the flex zone 200 altogether.

In one embodiment, the present invention includes a method for constructing a flex zone 200 by using a time limit; in other words, by including all the customers who can be accessed within a certain number of minutes. Generally, any of a variety of limits or constraints particularly suited to the unique characteristics of a service territory 20 may used to define a flex zone 200. Those skilled in the art of route planning will appreciate the various characteristics to be considered, which include but are not limited to terrain, travel time, travel distance (proximity), access along major roads and corridors, travel barriers such as railroad grade crossings and draw bridges, natural barriers such as rivers and mountains, as well as any other local factor affecting the dispatching and routing of vehicles.

8. Solution Method for the Stochastic Programming Model

The Visit Frequency Limit model may solved using empirical data, such as the grid segment visiting frequencies. For the Stochastic Programming model, in one embodiment of the present invention, a mathematical solution is provided. In the Stochastic Programming model, a set of optimal core areas is identified by solving a Non-linear Generalized Assignment Program (NGAP).

In this embodiment, it may be assumed that the demands $\xi_i$ are independent, normal, distributed random variables with means $\mu_i$ and standard deviations $\delta_i$. $M_k$ and $S_k$ are the mean and standard deviation, respectively, of the demand on core area k, where:

$$M_k = \sum_i \rho_{ik} T_i \mu_i I_{ik}$$

$$S_k = \sqrt{\sum_i (\rho_{ik} T_i \mu_i I_{ik})^2}$$

When the demands $\xi_i$ are normally distributed, there exists a constant $\tau$, such that:

$$Pr\left[\left(\sum_i \rho_{ik} T_i \xi_i I_{ik} - M_k\right) \Big/ S_k \leq \tau\right] = 1 - \alpha.$$

Therefore, the chance constraint becomes:

$$\sum_i \rho_{ik} T_i \mu_i I_{ik} + \tau \sqrt{\sum_i (\rho_{ik} T_i \delta_i I_{ik})^2} \leq Q_k - \sum_i \rho_{ik} C_{ik}$$

and the chance-constrained program becomes a non-linear integer program:

$$\text{Min } E\left[\sum_{i,k} \rho_{ik} T_i \xi_i I_{ik} + \sum_{i,k} \rho_{ik} C_{ik} I_{ik}\right] \quad (5)$$

$$\text{s.t. } \sum_k I_{ik} = 1, \begin{array}{l} i = 1, 2, \ldots, n \\ k = 0, 1, \ldots m \end{array} \quad (6)$$

$$\sum_i \rho_{ik} T_i \mu_i I_{ik} + \tau \sqrt{\sum_i (\rho_{ik} T_i \delta_i I_{ik})^2} + \sum_i \rho_{ik} C_i \le Q_k, (k = 1, \ldots, m) \quad (7)$$

$$I_{ik} = 0 \text{ or } 1, \begin{array}{l} i = 1, 2, \ldots, n \\ k = 0, 1, \ldots m \end{array} \quad (8)$$

Notice that:

$$E\left[\begin{array}{l}\sum_{i,k} \rho_{ik} T_i \xi_i I_{ik} + \\ \sum_{i,k} \rho_{ik} C_{ik} I_{ik}\end{array}\right] = \sum_{i,k} E[\rho_{ik} T_i \xi_i I_{ik}] + \sum_{i,k} \rho_{ik} C_{ik} I_{ik}$$

$$= \sum_{i,k} \rho_{ik} T_i [\xi_i] I_{ik} + \sum_{i,k} \rho_{ik} C_{ik} I_{ik}$$

$$= \sum_{i,k} \rho_{ik} T_i \mu_i I_{ik} + \sum_{i,k} \rho_{ik} C_{ik} I_{ik}$$

So, the above model becomes:

$$\text{Min } \sum_{i,k} \rho_{ik} T_i \mu_i I_{ik} + \sum_{i,k} \rho_{ik} C_{ik} I_{ik} \quad (9)$$

$$\text{s.t. } \sum_k I_{ik} = 1, \begin{array}{l} i = 1, 2, \ldots, n \\ k = 0, 1, \ldots m \end{array} \quad (10)$$

$$\sum_i \rho_{ik} T_i \mu_i I_{ik} + \tau \sqrt{\sum_i (\rho_{ik} T_i \delta_i I_{ik})^2} + \sum_i \rho_{ik} C_i \le Q_k, (k = 1, \ldots, m) \quad (11)$$

$$I_{ik} = 0 \text{ or } 1, \begin{array}{l} i = 1, 2, \ldots, n \\ k = 0, 1, \ldots m \end{array} \quad (12)$$

The above set of equations represents a type of Non-linear Generalized Assignment Problem (Non-linear GAP). There is no effective algorithm in the field for solving this kind of problem. In one aspect of the present invention, two alternative approaches to finding a solution were considered:
1. Find a linear approximation for the non-linear constraint expressed in Equation (11), and then transform the problem into an integer linear program, which can be solved using a sophisticated algorithm.
2. Construct a heuristic algorithm for a stochastic Core Area Design model which incorporates the spatial characteristics of the problem. At each iteration of the heuristic, the objective function in Equation (9) and the non-linear constraint in Equation (11) may be considered to guide the next search, such that an optimal solution can be found.

In one embodiment, the system of the present invention combines these two approaches in the following way. First, a meta-heuristic algorithm (applying a tabu search) is developed for solving the Non-linear GAP. Then, the non-linear constraint in Equation (11) is "linearized" to form a Linear GAP, the solution of which serves as a lower bound. The lower bound is then used to evaluate the quality of the solution produced by the meta-heuristic algorithm.

8.1. Combinatorial Optimization and Meta-Heuristics

In general, a Generalized Assignment Problem (GAP) involves assigning tasks to agents. Each task must be assigned to one and only one agent. Each agent has a limited amount of capacity. An agent may have multiple tasks assigned to it, but the sum of the resource requirements for these tasks must not exceed the agent's capacity. The resource requirements of a particular task and the assignment cost depend on the agent who will perform the task. The objective of this combinatorial optimization problem is to minimize the total assignment cost. The Non-linear GAP differs from the Linear GAP in that the objective function and the capacity constraint can be non-linear. In the context of route planning, the capacity constraint within each core area is non-linear.

The Non-linear GAP formulation for the stochastic Core Area Design model contains a large number of binary variables as well as non-linear constraints, making the task of obtaining an optimal solution more difficult. In one embodiment of the present invention, the following meta-heuristic algorithm with tabu search is provided as an approach to solving large-scale Non-linear GAPs. The method is based upon a tabu search methodology, which incorporates a number of sophisticated features, including long-term memory, systematic dynamic tabu tenure, and a highly-effective move decision mechanism derived from the notion of ejection chains.

Combinatorial optimization is the mathematical study of finding an optimal arrangement, grouping, ordering, or selection of a finite number of discrete objects. Many combinatorial problems (including Linear GAP and Non-linear GAP) are hard to solve (i.e., intractable). An optimal algorithm for intractable combinatorial problems would require an exponentially-growing number of computational steps as the problem size increases. Accordingly, only small problems can be solved within a reasonable time. In some applications, heuristics (or approximate algorithms) are used to find an approximate solution to a combinatorial problem.

Meta-heuristics are a class of algorithms that may be used to attack intractable combinatorial optimization problems where classical heuristics are not efficient. A meta-heuristic typically involves an iterative process using rules and information structures designed to produce an efficient and near-optimal solution. The methodologies underlying meta-heuristics may be derived from concepts such as classical heuristics, artificial intelligence, biological evolution, neural systems, and statistical mechanics. This family of approaches include genetic algorithms, greedy random adaptive search procedures, problem-space search, neural networks, simulated annealing, tabu search methods, and their hybrids.

8.2. Tabu Search Heuristics

Tabu or taboo may be defined as an adjective describing something that is set apart, forbidden, or banned because it constitutes a risk. In the mathematical context, a tabu search includes restrictions that forbid the selection of possible solutions known to be bad or inefficient. By incorporating the advantages of adaptive memory and responsive exploration, a tabu search emphasizes both intensification and diversification in the search strategy.

A tabu search typically starts from an initial solution, which may or may not be feasible. For each iteration, the tabu search rules are applied to evaluate possible "moves" within a matrix or system of possible solutions. Potential moves are found by exploring the "neighborhood" around the current solution. During each iteration, the potential moves are evaluated in terms of which is the most promising for improving the current solution, and that "best move" is selected. A move classified as tabu is excluded from the evaluation process. Any of the recently-generated potential moves may be classified as tabu. A local optimum may be classified as tabu, which allows this search method to drive the search beyond the local optimum and toward a global optimum.

8.2.1. Network Formulation

The mathematical model of the Non-linear GAP may be graphically represented by means of network-related formulation. The field of so-called "netforms" has allowed researchers to formulate problems as networks. There are also notational conventions that make possible the representation of problems in a general network-related framework. These include flow restrictions such as integer restrictions. The use of these conventions provides a concise representation of network programming problems with side constraints.

Figure 17:
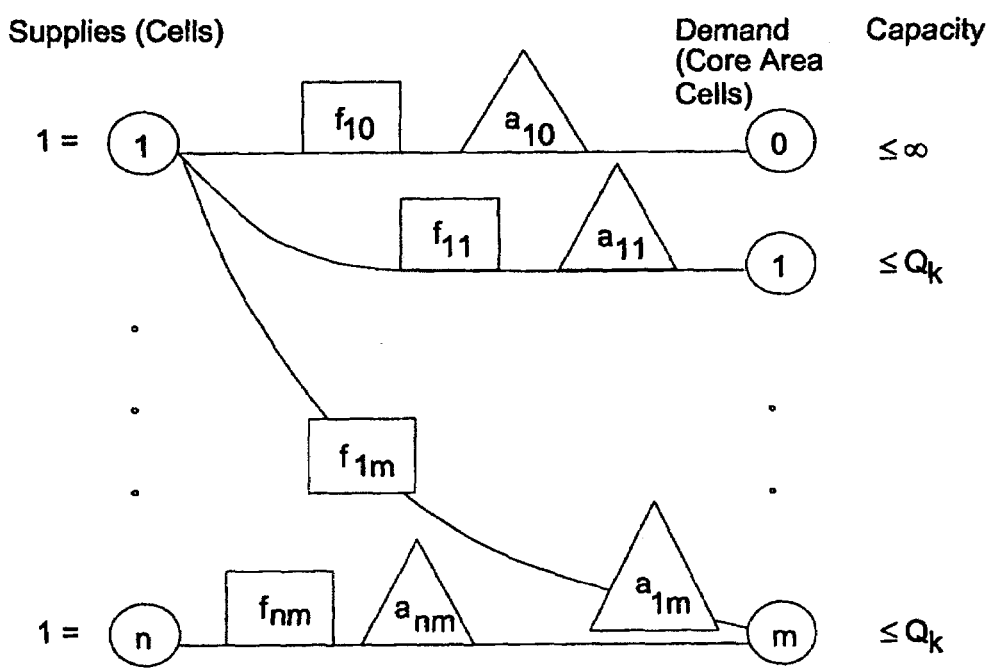
FIG. 17 is an illustration of a mathematical model known as a network-related formulation (or netform) that may be used to represent a non-linear generalized assignment problem, according to one embodiment of the present invention.

The Non-linear GAP netform consists of n+m+1 nodes and n×(m+1) arcs. For each source node j there is a fixed supply of one unit, and for each destination node k there is a demand that must not exceed $Q_k$ units. The flow in each arc is restricted to integers, so they can be only 0 or 1. There is also a cost $f_{ik}$ and a multiplier $a_{ik}$ for every arc, which respectively represent the cost and capacity requirement for assigning cell i to core area k. FIG. 17 shows the Non-linear GAP netform, where the costs are enclosed in boxes and the multipliers are enclosed in triangles.

From the Non-linear GAP formulation above:

$f_{ik} = \rho_{ik}(T_i \mu_i + C_{ik})$ and $a_{ik} = \rho_{ik}(T_i \mu_i + C_{ik}) + \phi_i$ where $\phi_i$ represents the contribution of cell i to the non-linear part:

$$\tau \sqrt{\sum_i (\rho_{ik} T_i \delta_i I_{ik})^2}$$

in the constraint Equation (11).

8.2.2. Neighborhood Structure

In a tabu search algorithm, a move is defined as a modification to a current solution according to a set of pre-defined procedures or rules that produce another, new solution. The collection of solutions that result from all possible moves around the current solution is called a neighborhood of the current solution.

Based upon a current solution of a Non-linear GAP, a basic move is to simply change the assignment of cell i from core area j to core area k. In terms of a netform, this simple move is equivalent to deleting the arc extending from node i to node j, and inserting an arc that extends from node i to node k. After every move, the assignment constraints in Equation (10) must be satisfied, but the capacity constraints in Equation (11) cannot be guaranteed to hold. In another words, infeasibility may occur if the capacity constraints are violated. This special feature of a move enables the tabu search to cross the feasible region of local optimal solutions and enter the realm of possible global optimal solutions.

A compound move refers to a combination or a series of simple moves, in which the number of components is decided by a certain compound move construction termination procedure. Compound moves do not concern isolated choices of moves with particular features, but rather involve coordinated choices of moves with interlinking properties. Procedures that incorporate compound moves are often called variable-depth methods, because the number of components involved in a compound move generally vary from step to step. A move neighborhood constructed from compound moves is more likely to produce effective and efficient moves.

Figure 18:
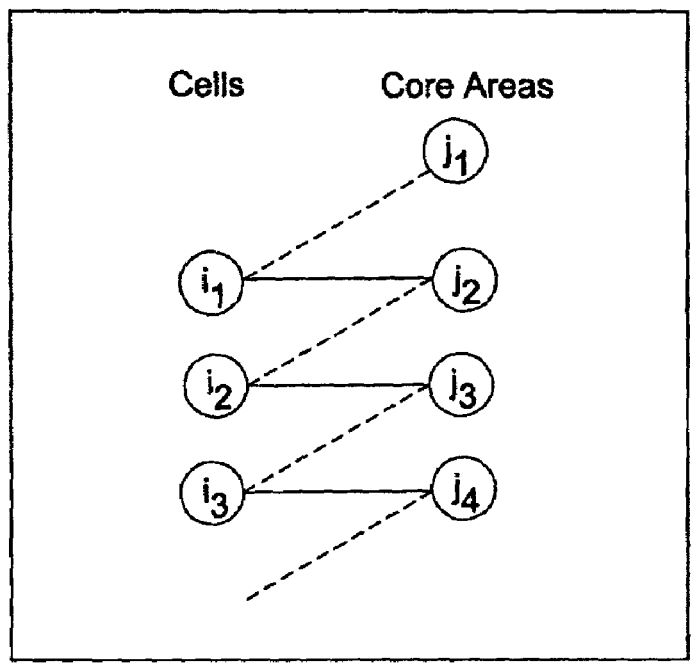
FIG. 18 is an illustration of an ejection-chain sequence for a non-linear generalized assignment problem model, according to one embodiment of the present invention.

The ejection chain method is a special subclass of the variable-depth methods. FIG. 18 shows an example ejection chain for the Non-linear GAP problem. An ejection chain is started by selecting a set of elements, whose states will undergo some changes (for example, to new values or new positions). The consequences of this change will cause at least one element in the set to be ejected from its current state.

In FIG. 18, the dashed lines represent the original assignment: cell $i_1$ to core area $j_1$, cell $i_2$ to core area $j_2$, and so forth. A simple move here is to reassign cell $i_1$ to core area $j_2$, as shown by the solid line. An ejection chain results because the move "ejects" an element: for the arc $(i_2, j_2)$ at node $j_2$, the connection to node $i_2$ must be re-assigned to a new core area ($j_3$ for example). This process may continue through additional nodes until a suitable termination criterion is met.

A simple termination criterion for the Non-linear GAP may be continuing the chain until no ejection occurs. In the context of core area assignments, there may exist a core area further down the chain which may have enough capacity to serve the last ejected node. At the least, the dummy core area zero has the capacity because it has no capacity constraints.

The capacity slack $s_k$ of core area k may be expressed as:

$$s_k = Q_k - \sum_i \rho_{ik} T_i \mu_i I_{ik} - \tau \sqrt{\sum_i (\rho_{ik} T_i \delta_i I_{ik})^2} - \sum_i \rho_{ik} C_{ik}$$

A solution is feasible only if all $s_k \geq 0$. The degree of infeasibility, $v$, of an assignment-feasible solution x, may be expressed as the absolute value of the sum of all the negative capacity slacks $s_k$:

$$v(x) = \text{abs}\left(\sum_{k=1}^{m} \min(s_k, 0)\right)$$

Therefore, solution x is feasible only if $v(x)=0$. The feasibility measure $v(x)$ is a component in the tabu search procedure.

Figure 19:
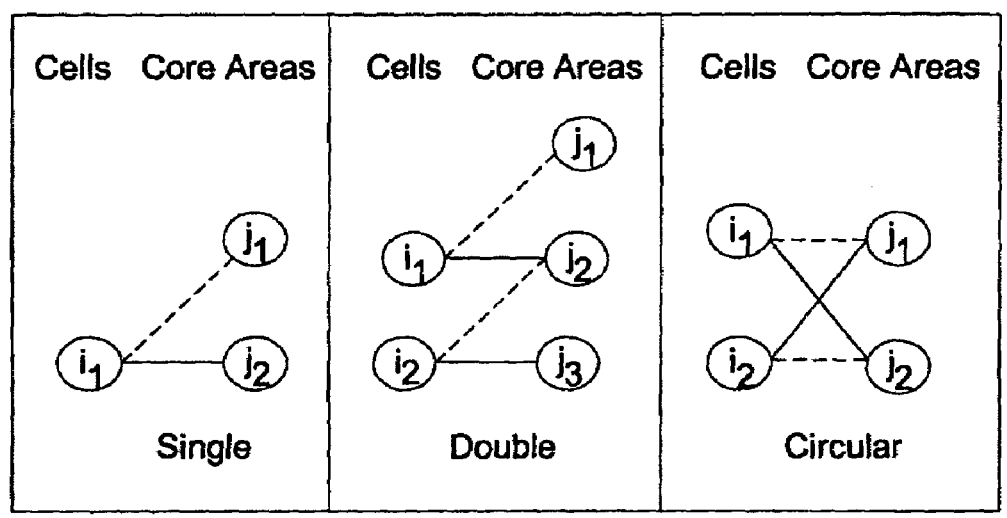
FIG. 19 is an illustration of several types of ejection chains that may be used as part of a tabu search procedure, according to one embodiment of the present invention.

In one embodiment, the present invention applies the following types of ejection chains in the tabu search procedure. FIG. 19 is a graphical representation of several types of ejection chains that may be used in the method of the present invention.

For a single-ejection chain, a leaving arc $(i, j_1)$, and an entering arc $(i, j_2)$, a feasibility condition may be expressed as $s_{j2} - (\rho_{ij2} T_i \mu_i + \rho_{ij2} C_{ij2} + \Phi_{ij2}) \geq 0$.

For a first double-ejection chain, having a leaving arc $(i_1, j_1)$ and an entering arc $(i_1, j_2)$, a feasibility condition may be expressed as $s_{j2} + (\rho_{i2j2} T_{i2} \mu_{i2} + \rho_{i2j2} C_{i2j2} + \delta_{i2j2}) - (\rho_{i1j2} T_{i1} \mu_{i1} + \rho_{i1j2} C_{i1j2} + \Phi_{i1j2}) \geq 0$.

For a second double-ejection chain, having a leaving arc $(i_2, j_2)$ and an entering arc $(i_2, j_3)$, a feasibility condition may be expressed as $s_{j3} - (\rho_{i2j3} T_{i3} \mu_{i3} + \rho_{i2j3} C_{i2j3} + \Phi_{i2j3}) \geq 0$.

For a first circular-ejection chain, having a leaving arc $(i_1, j_1)$ and an entering arc $(i_1, j_2)$, a feasibility condition may be expressed as $s_{j1} + (\rho_{i1j1} T_{i1} \mu_{i1} + \rho_{i1j1} C_{i1j1} + \delta_{i1j1}) - (\rho_{i2j1} T_{i2} \mu_{i2} + \rho_{i2j1} C_{i2j1} + \Phi_{i2j1}) \geq 0$.

For a second circular-ejection chain, having a leaving arc $(i_2, j_2)$ and an entering arc $(i_2, j_1)$, a feasibility condition may be expressed as $s_{j2} + (\rho_{i2j2} T_{i2} \mu_{i2} + \rho_{i2j2} C_{i2j2} + \delta_{i2j2}) - (\rho_{i1j2} T_{i1j2} \mu_{i1} + \rho_{i1j2} C_{i1j2} + \Phi_{i1j2}) \geq 0$.

8.2.3. Tabu Search Procedure

Initialization. In the initialization step, a starting solution (it may be feasible or not) may be generated and the objective function value may be calculated. Also, all data structures, including a tabu matrix, a long-term memory, and a solution matrix may be initialized. The tabu data structure may take the form of a time stamp that indicates the iteration number at which a move "clears itself" from having a tabu status. Specifically, a two-dimensional array such as one referred to as "tabu_size" may be created, where the (i, j) element of this array holds the iteration number at which arc (i, j) will clear its tabu status, and it can re-join the neighborhood construction procedure for selecting the best move. At the beginning of the search, "tabu_size" must be initialized to zero.

In one embodiment of the present invention, the method uses a starting solution in which all cells are assigned to the dummy core area zero. In other words, at the beginning, all cells are unassigned. Therefore, the objective of the starting solution may be expressed as:

$$\sum_{i=1}^{n} (\rho_{i0} T_i \mu_i + \rho_{i0} C_{i0})$$

Best Move. Tabu search methods are designed to select the best move available at each step, based upon the current search state. There are many criteria for selecting the best move. One simple example is to select the move that has the best improvement in objective function, $Z(x)$. In one embodiment, the method of the present invention combines the best improvement function $Z(x)$ with the feasibility measure $v(x)$ in the following manner:

Where x is the current solution, x' is the neighboring solution for which $Z(x')-Z(x)$ is minimized, and x' is the neighboring solution for which $v(x')-v(x)$ is minimized (in other words, the ties are broken by comparing the change in the objective function value), the best move is defined as follows, for the following solution states:

For the solution state defined by $v(x)>0$, the best move is x".

For the solution state defined by $v(x)=0$ and $v(x")\leq\theta$, the best move is x".

For the solution state defined by $v(x)=0$ and $v(x")>\theta$ and $Z(x")>\theta$, the best move is x".

For the solution state defined by $v(x)=0$ and $v(x")>0$ and $Z(x")>\theta$, the best move is x'.

When the current solution is not feasible, the best move is the one that reduces the infeasibility the most. When the current solution is within the feasible region but no feasible move exists, the search will select the move that has the smallest objective function value. Non-improving moves are accepted as long as the moves are within the feasible region and the associated objective function values do not exceed the threshold $\theta$. However, when the associated objective function values exceed this threshold, the search selects as the best move the move that reduces the objective function value the most. This best move may possibly lead the search into the infeasible region, which makes it possible to explore other feasible regions.

Threshold $\theta$ is defined as the objective function value of the first solution found when the search last entered a feasible region. The objective function value $Z(x_B)$ of the best solution $x_B$ is updated each time the search enters the feasible region. If m×n iterations have passed without improving $Z(x_B)$, then $\theta$ is reset to the objective function value of the current solution $Z(x)$, which may prompt the non-improving search state to cross the capacity-feasibility boundary and enter the infeasible region.

Evaluating moves includes the task of evaluating the change in objective function value and the change in overall capacity slack. The evaluation of change in objective function value is straightforward:

For single ejection chain $(i_1, i_1) \Rightarrow (i_1, j_2)$:

$$Z(x')-Z(x) = \rho_{i_1 j_2} T_{i_1} \mu_{i_1} + \rho_{i_1 j_2} C_{i_1 j_2} - \rho_{i_1} T_{i_1} \mu_{i_1} - \rho_{i_1 j_1} C_{i_1 j_1}$$

For double ejection chain $(i_1, j_1) \Rightarrow (i_1, j_2), (i_2, j_2) \Rightarrow (i_2, j_3)$:

$$Z(x')-Z(x) = \rho_{i_1 j_2} T_{i_1} \mu_{i_1} + \rho_{i_1 j_2} C_{i_1 j_2} + \rho_{i_2 j_3} T_{i_2} \mu_{i_2} + \rho_{i_2 j_3} C_{i_2 j_3} - \rho_{i_1 j_1} T_{i_1} \mu_{i_1} - \rho_{i_1 j_1} C_{i_1 j_1} - \rho_{i_2 j_2} T_{i_2} \mu_{i_2} - \rho_{i_2 j_2} C_{i_2 j_2}$$

For circular ejection chain $(i_1, j_1) \Rightarrow (j_1, j_2), (i_2, j_2) \Rightarrow (i_2, j_1)$ $$Z(x')-Z(x) = \rho_{i_1 j_2} T_{i_1} \mu_{i_1} + \rho_{i_1 j_2} C_{i_1 j_2} + \rho_{i_2 j_1} T_{i_2} \mu_{i_2} + \rho_{i_2 j_1} C_{i_2 j_1} - \rho_{i_1 j_1} T_{i_1} \mu_{i_1} - \rho_{i_1 j_1} C_{i_1 j_1} - \rho_{i_2 j_2} T_{i_2} \mu_{i_2} - \rho_{i_2 j_2} C_{i_2 j_2}$$

The evaluation of change in overall capacity slack is more complicated. The evaluation for a single-ejection chain is illustrated using pseudo-code, as follows:

```
c₁ ← 0;
c₂ ← 0;
if(j₁ !=0)
{
    φ₁ ← ∑ (ρ_{ij₁} T_i δ_i)²;
         i assigned to j₁
    φ₂ ← φ₁ - (ρ_{i₁j₁} T_{i₁} δ_{i₁})²;
    φ₁ ← τ√φ₁ ;
    φ₂ ← τ√φ₂ ;
    d₁ ← -min(s_{j₁}, 0);
    d₂ ← ρ_{i₁j₁} T_{i₁} μ_{i₁} + ρ_{i₁j₁} C_{i₁j₁} + φ₁ - φ₁;
    c₁ ← min(d₁, d₂);
}
if(j₁ !=0)
{
    φ₁ ← ∑ (ρ_{ij₂} T_i δ_i)²;
         i assigned to j₂
    φ₂ ← φ₁ + (ρ_{i₁j₂} T_{i₁} δ_{i₁})²;
    φ₁ ← τ√φ₁ ;
    φ₂ ← τ√φ₂ ;
    d₁ ← -max(s_{j₁}, 0);
    d₂ ← ρ_{i₁j₂} T_{i₁} μ_{i₁} + ρ_{i₁j₂} C_{i₁j₂} + φ₂ - φ₁;
    c₂ ← min(d₁ - d₂, 0);
}
v(x')-v(x) ← -(c₁ + c₂);
```

The double-ejection chain and circular-ejection chain use a similar methodology and, hence, a similar pseudo-code.

In this tabu search meta-heuristic, the best move procedure is computationally more expensive than any other procedure (for example, the executing move procedure or the updating procedure). The best move selection procedure may consume a length of time that may be expressed as $O(n^2)$. Because the best move procedure is time-intensive, the method of the present invention improves to computational efficiency of the move evaluation procedures. In the pseudo-code above, most of the computation time is spent calculating the change in the non-linear portion of the capacity slack. For a larger problem, which may require thousands of moves to be evaluated during each step, the search speed may likely be slower.

To accommodate for slower search speeds, the method of the present invention in one embodiment includes a linear approximation for the non-linear $$\tau \sqrt{\sum_i (\rho_{ik} T_i \delta_i I_{ik})^2} \approx \tau \left( \sum_i \rho_{ik} T_i \delta_i I_{ik} \right) / \sqrt{n_k}$$

portion in constraint Equation (11) above, as follows:

where $n_k$ is the total number of cells assigned to core area k. In the context of the Non-linear GAP model:

$$n_k = \sum_i I_{ik}$$

To test the quality of this approximation, the value of these two expressions may be recorded each time the evaluation procedure is executed during the tabu search procedure.

In one embodiment of the present invention, the method includes replacing the non-linear portion of the capacity slack with the linear approximation developed above for the move evaluation procedure. In use, the linear approximation has no significant affect on the tabu search solution quality. Using the linear approximation, the pseudo-code above becomes simplified:

```
c₁ ← 0;
c₂ ← 0;
if (j₁ !=0)
{
   d₁ ← -min(s_{j₁},0);
   d₂ ← ρ_{ij₁}T_{i₁}μ_{i₁} + ρ_{ij₁}C_{ij₁} + τ(ρ_{ij₁}T_{i₁}δ_{i₁}/√n_{j₁});
   c₁ ← min(d₁,d₂);
}
if (j₂ !=0)
{
   d₁ ← max(s_{j₁},0);
   d₂ ← ρ_{ij₂}T_{i₁}μ_{i₁} + ρ_{ij₂}C_{ij₂} + τ(ρ_{ij₂}T_{i₁}δ_{i₁}/√n_{j₂});
   c₂ ← min(d₁ - d₂,0);
}
v(x') - v(x) ← -(c₁ + c₂);
```

A move can only be selected as a candidate for the best move if (1) the entering arc associated with the move is not in tabu status, or (2) a set of aspiration criteria are met so as to clear its tabu status. In the tabu search procedure, aspiration criteria are used if the move currently under evaluation leads the search to the best feasible solution ever found. In this case, the tabu status of the move is overridden.

Executing a Move and Updating Tabu. The execution of the best move will update the current trial solution. In this embodiment, the items that need to be updated are:

The current solution structure.
The capacity slack structure for all core areas.
The best move selection objective function value threshold θ.

The best objective function value found so far.
The data structure that holds the number of cells that currently assigned to each core area.
The tabu structure and the long term memory.

All these items are directly affected by changes in a current trial solution. Updating the tabu structure and the long-term memory may be accomplished as follows:

After a move has been executed, the leaving arc (for example, the arc $(i_1, j_1)$ in the single-ejection chain) becomes tabu. During the tabu procedure, the leaving arc is not allowed to be part of the solution. The tabu tenure (which is the number of iterations during which the leaving arc remains tabu) is a function of three elements:

(1) The number of possible arcs leaving the same source node (cell) where the leaving arc originates (in the Non-linear GAP, the number of such possible arcs is m+1);
(2) The difference between the ranks of the leaving arc and the entering arc; and
(3) The frequency with which the leaving arc has been a member of a previously-selected ejection chain.

Suppose the leaving and entering arcs are $(i_L, j_L)$ and $(i_E, j_E)$, respectively. Then, the tabu tenure of leaving arc $(i_L, i_L)$ may be expressed as:

$$\text{tabu\_time}(i_L, j_L) = (m+1)\left(\frac{3}{2} + \frac{\Delta}{2m}\right) + m\frac{\Omega(i_L, j_L)}{\Omega_{max}}$$

where:

$\Omega(i_L, j_L)$=the number of times arc $(i_L, j_L)$ has been part of an executed move;
$\Omega_{max}$=the maximum $\Omega(i_L, j_L)$ for all $(i, j)$;
$\Delta = r(i_L, j_L) - r(i_E, j_E)$; and
$r(i, j)$=the position of arc $(i_E, j_E)$ when all arcs leaving node j are ordered by increasing value of the expected cell-to-cell travel time contribution of assigning cell i to core area j in an optimal route or cell tour (that is, the parameter $C_{ij}$ in the Non-linear GAP model).

From the expression above, the minimum tabu time value is (m+1) when:

(1) the leaving arc has the best rank (i.e., when $r(i_L, j_L)=1$);
(2) the entering arc has the worst rank (i.e., when $r(i_E, j_E)=m+1$); and
(3) the leaving arc has never been part of an executed ejection chain (i.e., when $\Omega(i_L, j_L)=0$).

On the other hand, the maximum tabu time value is (3 m+1), when:

$r(i_L, j_L)=m+1$, $r(i_E, j_E)=1$ and $\Omega(i_L, j_L)=\Omega_{max}$.

Overall, by implementing this tabu search procedure, with special features such as a systematic dynamic tabu list, long-term memory, and ejection chains, the method of present invention represents an effective and computationally-efficient heuristic method for solving the Non-linear GAP model for identifying the core areas.

8.3. Solution Quality

The linearization of the non-linear constraint disclosed herein transforms the Non-linear GAP into a Linear GAP, the solution for which may serve as a lower bound for the Non-linear GAP. Comparing the solution of the tabu search heuristic with this lower bound provides a measure of the solution quality of the tabu search heuristic.

The non-linear constraints for the Non-linear GAP are expressed in Equation (11):

$$\sum_i \rho_{ik} T_i \mu_i I_{ik} + \tau \sqrt{\sum_i (\rho_{ik} T_i \delta_i I_{ik})^2} + \sum_i \rho_{ik} C_{ik} \leq Q_k, (k = 1, \ldots, m)$$

The following equations represent the linearized counterparts of the non-linear constraints in Equation (11):

$$\sum_i \rho_{ik} T_i \mu_i I_{ik} + \frac{\tau \sum_i (\rho_i T_i \delta_i I_{ik})}{\sqrt{n}} + \sum_i \rho_{ik} C_{ik} \leq Q_k, (k = 1, \ldots, m) \quad (13)$$

Notice that if equations (11) are met, then equations (13) are also met. This means that the feasible region restricted by constraints (13) by definition contains the feasible region restricted by constraints (11). Therefore, the Linear GAP expressed in Equations (9), (10), (13), and (12) must contain the optimal solution of the Non-linear GAP expressed in Equations (9), (10), (11), and (12). Hence, the optimal solution of the approximation GAP may be used to serve as the lower bound of the Non-linear NGAP.

Software such as CPLEX Mixed Integer Programming (MIP) solver for solving the approximation GAP equations for a lower bound. In some cases, where a software system cannot find an optimal solution within a node limit, the Linear Programming (LP) solution of the problem may be used as a more-restrictive lower bound. Comparing these two lower bounds provides a reasonable measurement of the tabu search solution quality.

9. Operational Cell Routing

Operation cell routing involves the assignment of non-core or daily cells 70 to a route, and also involves the ordering or sequencing of stops in a route. FIG. 9 depicts a flex zone 200 containing flex zone cells 50, several core areas 100 containing core cells 60, and a set of first exemplary delivery areas 80 within a service territory 20. The first exemplary delivery areas 80 include a number of daily cells 70.

Figure 10:
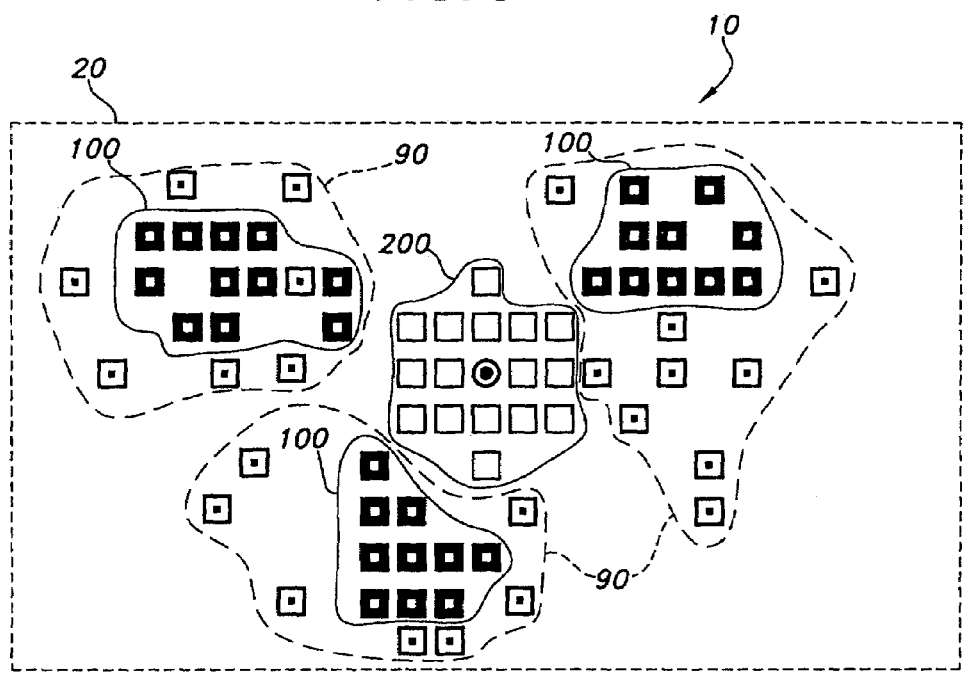
FIG. 10 is an illustration of a set of second exemplary delivery areas for another day within the service territory, according to one embodiment of the present invention.

FIG. 10 shows a group of second exemplary delivery areas 90 for a particular day within the service territory 20. As shown, the second exemplary delivery areas 90 include different daily cells 70 than those assigned to the first exemplary delivery areas 80 in FIG. 9. The system 10 of the present invention accommodates a variety of constraints and changing conditions when assigning the daily cells 70 to a particular core area 100.

In one embodiment, the present invention includes a method of selecting the core area 100 best suited to include a particular daily cell 70. In one embodiment, a method of the present invention includes establishing a proximity factor relating each daily cell 70 to each core area 100. The proximity factor may include a distance element, a time element, or any additional element relevant to selecting the best core area 100 to accept the daily cell 70.

This operational cell routing problem may be formulated mathematically as an integer linear program with a three-index vehicle flow. In this formulations, a graph G may include a set of vertices V (representing cells) and a set of arcs A. The hub 30 in the service territory may be located at vertex 1. In mathematical terms, let $G=(V, A)$ be a graph where $V=\{1, \ldots, n\}$ is a set of vertices and A is a set of arcs.

A non-negative travel time matrix $C=(c_{ij})$ is associated with every arc $(i, j)$, $i \neq j$. The term $c_{ij}$ can be interpreted as the overall travel time from cell i to cell j, which includes the cell-to-cell travel time $d_{ij}$ and the travel time $w_i$ within cell i. Accordingly, $c_{ij} = d_{ij} + w_i$. In practice, the values of $d_{ij}$ and $w_i$ may depend on other cells.

In one embodiment, the method of the present invention includes a travel time matrix constructed based upon approximation models disclosed above. The matrix may include a fleet of m available vehicles, where the value of m may be fixed or variable. When m is variable, the cost associated with adding a vehicle may be ignored. All vehicles may be assumed to be identical and driven by drivers having the same total workday duration, such that the duration of any route many not exceed a prescribed limit Q.

A set $U_k$ may be defined that includes all core cells 60 assigned to driver k. The problem is to design a set of least-time duration vehicle routes such that:

(1) each core cell 60 is visited exactly once, by exactly one vehicle (and its one driver);
(2) each route starts and ends at the hub 30;
(3) no route exceeds time duration limit Q; and
(4) all core cells 60 assigned to a particular vehicle are served only by that vehicle.

Using a three-index formulation, the variables $x_{ijk}$ indicate whether location $(i, j)$ is traversed by vehicle k or not. The binary variables $y_{ik}$ are set to equal 1 if a cell i is served by vehicle k. Accordingly, the three-index formulation may be expressed as follows:

$$\min. \sum_{k=1}^{m} \sum_{i \neq j} c_{ij} x_{ijk} \quad (14)$$

$$\text{s.t.} \sum_{i \neq j} c_{ij} x_{ijk} \leq Q \; (k = 1, \ldots, m) \quad (15)$$

$$\sum_{i=1}^{n} y_{ik} = \begin{cases} m & (i = 1) \\ 1 & (i = 2, \ldots, n) \end{cases} \quad (16)$$

$$\sum_{i=1}^{n} x_{ijk} = y_{jk} \; (j = 1, \ldots, n; k = 1, \ldots, m) \quad (17)$$

$$\sum_{j=1}^{n} x_{ijk} = y_{ik} \; (i = 1, \ldots, n; k = 1, \ldots, m) \quad (18)$$

$$\sum_{i,j \in S} x_{ijk} \leq |S| - 1 \; (S \subset V; |S| \geq 2; k = 1, \ldots, m) \quad (19)$$

$$y_{ik} = 1 \; (i \in U_k, k = 1, \ldots, m) \quad (20)$$

$$x_{ijk} \in \{0,1\} \; (i, j = 1, \ldots, n; k = 1, \ldots, m) \quad (21)$$

$$y_{ik} \in \{0,1\} \; (i = 1, \ldots, n; k = 1, \ldots, m) \quad (22)$$

The constraint in Equation (15) represents the total time restriction Q, for each driver's maximum workday duration. The constraint in Equation (19) is a sub-tour elimination constraint.

The operational cell routing model expressed in this three-index formulation is similar to a classical vehicle routing problem (VRP) with a maximum driver workday duration constraint, except for the pre-assignment constraint in Equation (20) and the following differences:

(1) The operational cell routing model is for routing cells instead of individual stops. Routing at the cell level is more complicated because the cost of an arc exiting a cell depends on the preceding cell as well as the next cell.
(2) The model must accommodate the fact that some of the cells are assigned as core cells 60 to a regular driver.
(3) The effect of driver learning is incorporated in the route planning process, so that certain cells are assigned to the most-familiar driver.

In one embodiment, the method of the present invention addresses these differences by adding features to the classical VRP solution method, as disclosed below in section 8.2.

9.1. The VRP Algorithm

In one embodiment, the method of the present invention begins with a set of VRP algorithms that combine a sequential route construction heuristic and a parallel route construction heuristic. The solutions may be improved by implementing an inter-route tabu search procedure.

A sequential route construction heuristic builds routes one at a time until all the stops are routed, whereas a parallel route construction heuristic builds multiple routes simultaneously. The basic methodologies, however, are the same in that both heuristics proceed by inserting one stop at a time into the emerging route or routes, and the choices of which stop to insert and where to insert it are based on heuristic cost measures.

For example, a sequential route construction heuristic may include the following steps:
(1) select a seed stop for a new route;
(2) for each remaining un-routed stop, select one un-routed stop and select an associated position on a current route that yields the best insertion cost. If the new route duration satisfies the maximum workday duration limit, then execute the insertion and repeat this step; otherwise, go to step (1);
(3) terminate the heuristic.

Based upon this insertion framework, the construction of a new route starts by selecting a seed stop.

In one embodiment of the present invention, the strategy used is to select the un-routed stop located furthest from the depot or hub 30. The insertion cost may be calculated as follows. Assume the current route consists of stops (1, 2, . . . , i, j, . . . , n), in that order. Stop u is an un-routed stop. The cost of inserting stop u between stops i and j may be expressed as:

$$c(i,u,j) = d_{iu} + d_{uj} - d_{ij}$$

where d is the distance matrix among stops. If this insertion is not feasible, then the insertion cost c is infinite.

The best insertion position for stop u, (i*, j*) is the one that yields:

$$c(i^*, u, j^*) = \min_{k=1, \ldots, n} \{c(k, u, k+1)\}$$

The next stop to be inserted into the route, then, is the one that yields:

$$c(i^{**}, u^*, j^{**}) = \min_u \{c(i^*, u, j^*)\}$$

and stop u* is inserted between stops i and j.

A parallel route construction heuristic, for example, may begin with k routes, each having a seed stop, such that the initial route may be expressed in the form of (depot, seed, depot). The value of k may be determined from the result of the sequential route construction heuristic, above. The steps in the parallel route construction heuristic may be similar to those in the sequential route construction heuristic. In each step of the parallel route construction heuristic, select an un-routed stop to be inserted into a position on the route that yields the best insertion cost. If there are no un-routed stops remaining, the algorithm terminates.

In one embodiment, the parallel route construction heuristic may employ a regret measure to select the next un-routed stop to be routed. The regret measure may be based on the insertion cost function c(i, u, j) mentioned above in the sequential heuristic. For each un-routed stop u, the algorithm first calculates the feasible insertion position of u on each of the k routes. The best insertion cost for stop u may be expressed as $c_r(u) = c(i_r^*, u, j_r^*)$, for a best insertion position located between stops $i_r^*$ and $j_r^*$. Applying these conditions, the best insertion cost overall for stop u is the one that satisfies the equation:

$$c^*(u) = \min_{r=1,\ldots,k} c(i_r^*, u, j_r^*)$$

If route r* is denoted as the route on which $c_r(u) = c^*(u)$, then the regret cost for stop u may be expressed as:

$$regret(u) = \sum_{r \neq r^*} (c_r(u) - c_{r^*}(u))$$

The algorithm then selects the next un-routed stop u* that has the maximum regret cost:

$$regret(u^*) = \max_u (regret(u))$$

and inserts stop u* into its associated best route r*, at the best position $(i^*_{r*}, j^*_{r*})$ The algorithm repeats the above process until all stops are routed or there is no route that can accept an un-routed stop, at which point a new route is created following the same procedure as described in the sequential route construction heuristic.

In one embodiment, the system of the present invention provides three types of route improvement procedures:
(1) The Intra-route Exchange procedure attempts to re-order the stop sequence within a given route in order to achieve better route cost. In one embodiment, the best route cost has the shortest total route duration, within the maximum workday duration constraint. One of the methods used to accomplish the Intra-route Exchange procedure may be an algorithm known as a two-opt exchange heuristic, which involves replacing two arcs of a route with two other arcs that are not on the route.
(2) The Inter-route Transfer procedure removes a stop from one route and inserts it into another route, to determine if the transfer reduces the total route cost.
(3) The Inter-route Exchange procedure swaps a stop on one route with a stop on another route, to determine if the exchange reduces the total route cost, within the maximum workday duration constraint.

9.2. Adaptation of a VRP Algorithm

The operational cell routing model of the present invention is expressed in a three-index formulation. The inventive model is similar to a classical vehicle routing problem (VRP) constrained by a maximum driver workday duration, except for the pre-assignment constraint in Equation (20) above and the following three differences:
(1) the inventive model is for routing cells instead of individual stops;

(2) the inventive model incorporates the fact that some of the cells are assigned as core cells 60; and (3) the inventive model includes the effect of driver learning.

In one embodiment, the method of the present invention addresses these three differences, as discussed below.

First, in one embodiment, the present invention includes a VRP solution method adapted for routing entire cells instead of individual stops. In one aspect, a cell may be treated mathematically as a large super-stop, having a location at the centroid of all stops within the cell and a service time equal to the time needed to serve all the stops within the cell including travel time between stops.

For a route consisting of cells $(1, 2, \ldots, i, j, \ldots, n)$, in that order. Cell u is an un-routed super-stop. The cost of inserting cell u between stops i and j may be expressed as:

$$C(i,u,j) = D_{iu} + D_{uj} - D_{ij}$$

where D is the distance matrix among cells. If the insertion is not feasible, the insertion cost C is infinite. The cost C may be referred to as a cost constraint, in relation to the adapted VRP algorithm.

Second, in one embodiment, the present invention includes a VRP solution method adapted for the fact that some of the cells are assigned as core cells 60 to a regular driver. The number of core cells k may be determined by the number of regular drivers or by the expected minimum number of drivers needed each day. Therefore, k partial routes may be used to serve as a starting point. The series of k partial routes may be referred to as a core constraint, in relation to the adapted VRP algorithm being formulated. The starting point of k partial routes is similar to the starting point for the parallel route construction heuristic described above. Accordingly, there is no need to run a sequential route construction heuristic to determine the number of routes.

Because the core cells 60 only form an un-sequenced partial route, the cells 60 must be re-ordered with the objective of minimizing the total route duration. In application, this is similar to a traveling salesman problem (TSP), where the unit is a cell instead of a single stop. In one embodiment, the method of the present invention includes a simple insertion heuristic for solving this problem. The insertion cost may be calculated as shown above.

In another aspect, the method of the present invention makes certain the core cells 60 are not moved or transferred to other routes and drivers by the route improvement procedures, such as inter-route transfer and inter-route exchange.

Third, in one embodiment, the present invention includes a VRP solution method adapted to include the effect of driver learning. The route construction method may include the step of building a dynamic driver performance matrix Pmat, which may be used to store each driver's historical performance level in each cell, in terms of the percentage of standard time the driver needs to serve each cells and travel from cell to cell. In the matrix, Pmat (i, k) may represent the current performance level for a driver k in a cell i. After a route plan is generated for a current day, the matrix Pmat may be updated with the day's cell assignments.

If cell i is assigned to driver k on a subsequent day, then according to learning curve, Pmat (i, k) should be updated to:

$$Pmat(i, k) = \max\left\{ T_0 \cdot \left[ \left( \frac{Pmat(i, k)}{T_0} \right)^{-\frac{1}{f}} + 1 \right]^{-f}, T_\infty \right\}$$

where $T_0$ is the starting performance level, $f$ is the learning and forgetting rate, and $T_\infty$ is the learning limit. Beginning from $T_0 = 100\%$, then:

$$Pmat(i, k) = \max\left\{ \left[ (Pmat(i, k))^{-\frac{1}{f}} + 1 \right]^{-f}, T_\infty \right\}$$

If cell i is assigned to a driver other than driver k, then according to the forgetting curve, Pmat (i, k) should be updated to:

$$Pmat(i, k) = \min\left\{ T_\infty \cdot \left[ \left( \frac{x}{T_\infty} \right)^{\frac{1}{f}} + 1 \right]^{f}, T_0 \right\}$$

This dynamic driver performance matrix Pmat serves as a multiplier for the total time $T_{ik}$ needed to serve all stops in cell i by driver k, and the travel time $D_{ij}$ from cell i to cell j. Applying this multiplier means that, wherever the terms Tik and D11 appear, the new terms Pmat(i,k)*$T_{ik}$ and Pmat(i,j)*$D_{ij}$ are used instead. The new terms reflect the time savings generated by driver learning. Thus, the mathematics confirm the advantage of assigning each cell to the driver who is most familiar with it. The new Pmat terms may be referred to as a driver learning constraint, in relation to the adapted VRP algorithm being formulated. In one aspect, the method of the present invention used to build the dynamic driver performance matrix Pmat is a heuristic method because it is myopic, in the sense that it doesn't consider the effect of the driver assignment on learning over the long term.

9.3. Optimal Stop Sequence within a Cell

The Operational Cell Routing method disclosed herein produces a set of routes that will guide each driver from cell to cell. In one embodiment, the method of the present invention finds an optimal stop sequence (within a cell) from a given cell-to-cell sequence.

The Stop Sequence Problem (SSP) assumes that nodes of a given graph G have been grouped into m mutually-exclusive and exhaustive node subsets Si (where $i=1, 2, \ldots, m$) and all nodes need to be visited subset-by-subset in a given subset sequence. The objective for the SSP is to find a node tour that starts and ends at subset $S_0$, that only has one node (the depot or hub 30), visits all nodes exactly once, and has a minimum total distance traveled.

The SSP may be solved by solving two sub-problems: the Open Traveling Salesman Problem (OTSP) and the Multi-stage Graph Problem (MGP), using dynamic programming methods.

In this context, an entry node of subset Si is the first visited node among all nodes in this subset. An exit node of subset Si is the last visited node among all nodes in this subset. If there is only one node in a subset, then the entry node and the exit node coincide. If there is more than one node in a subset, then the entry node and the exit node cannot be the same.

An optimal traversal of all nodes in a subset Si, when required to start at a given entry node and end at a specific exit node of that subset, may be obtained using dynamic programming. These requirements are similar to those in the Open Traveling Salesman Problem (OTSP).

The subset Si may include n nodes. A tour may be defined as a simple path that starts at an entry node and ends at exit node. Without loss of generality, the nodes may be ordered from 1 to n, with the entry node having an index of 1 and the exit node having index of n. Every tour consists of an edge ⟨1, k⟩ for some k∈V−{1, n} and a path from nodes k to n. The path from nodes k to n passes through each node in V−{1,n,k} exactly once. For an optimal tour, the path from nodes k to n must be a shortest k-to-n path passing through all nodes in V−{1,n,k}.

Let g(i,V) represent the length of a shortest path starting at node i, passing through all nodes in V, and terminating at node n. Accordingly, the path g(1,$S_i$−{1, n}) represents the length of an optimal Open TSP tour, where:

$$g(1, S_i - \{1, n\}) = \min_{2 \leq k \leq n-1}(c_{1k} + g(k, S_i - \{1, n, k\}))$$

and $c_{1k}$ is the distance between node 1 and node k. In general, then:

$$g(i, V) = \min_{j \in V}(c_{ij} + g(j, V - \{j\}))$$

Based on these two equations, the Open TSP may be solved using dynamic programming by building a recursive function.

Further, each pair of entry nodes and exit nodes $en_i$, $ex_i \in Si$ may be associated with a value $l_i\{en_i, ex_i\}$ that corresponds to the length of an optimal Open TSP traversal of subset Si. Accordingly, the original Stop Sequence Problem may be solved by finding a pair of entry and exit nodes $\{en_i, ex_i\}$ for each subset Si (i=1, 2, . . . , m) and minimizing:

$$\sum_{i=0}^{m-1}(C(ex_i, en_{i+1}) + l_i(en_i, ex_i))$$

where C is the distance matrix between all the nodes in the original graph G. Accordingly, the term $C(ex_i, en_{i+1})$ represents the distance traveled from subset I to subset I+1.

In another aspect of the method, the problem may be converted to a Multi-stage Graph Problem (MGP) and solved to optimality. A multi-stage graph G=(V,E) is a directed graph in which the vertices are partitioned into K≥2 disjoint sets $V_i$, 1≤i≤k. On the graph G, if ⟨u,v⟩ is an edge in E, then u∈$V_i$ and v∈$V_{i+1}$ for some i, 1≤i≤k. The sets $V_1$ and $V_k$ are such that $|V_1|=|V_k|=1$. Let s and t, respectively, be the vertices in $V_1$ and $V_k$. The vertex s is the source, and t is the sink. Let c(i, j) be the cost of edge ⟨i, j⟩. The cost of a path from s to t is the sum of the costs of the edges on the path.

Figure 20:
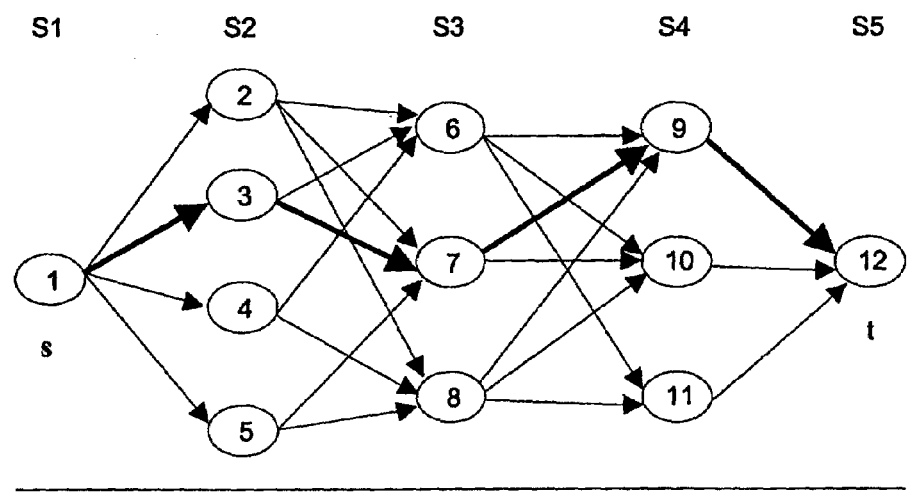
FIG. 20 is an illustration of a five-stage graph problem and a minimum-cost solution, according to one embodiment of the present invention.

The solution to the multistage graph problem, generally, is to find a minimum-cost path from s to t. Each set $V_i$ defines a stage in the graph. Because of the constraints on E, every path from s to t starts in stage 1, proceeds to stage 2, then to stage 3, and so on, and eventually terminates in stage k. FIG. 20 shows a five-stage graph. A minimum-cost path from s to t is indicated by the bold edges.

Notice that every path from s to t is the result of sequence of (k−2) decisions. The ith decision in the sequence is made to determine which vertex in stage $V_{i+1}$, 1≤i≤k−2 should be chosen to be on the path. For a fair number of nodes, this problem may be solved by a dynamic programming formulation as follows:

Let P(i, j) be a minimum-cost path from vertex j in stage $V_i$ to vertex t and let cost(i, j) be the cost associated with this path:

$$cost(i, j) = \min_{\substack{u \in V_{i+1} \\ \langle j, u \rangle \in E}}\{c(j, u) + cost(i+1, u)\}$$

One of the objectives is to find a path P(1,s) with the minimum cost, cost(i, j). Because:

$$\cos t(k-1,j) = c(j,t) \text{ if } \langle j, t \rangle \in E$$

and $$\cos t(k-1,j) = \infty \text{ if } \langle j, t \rangle \notin E,$$

the minimum cost (1, s) may be obtained by calculating cos t (k−2,j) for all vertices in stage (k−2) first, and going forward. An algorithm such as the following Fgraph algorithm may be used:

```
1    Algorithm Fgraph(G, k, n, p)
2    //The input is a k-stage graph G=(V,E) with n vertices
3    //indexed in order of stages. E is a set of edges and c[i,j]
4    //is the cost of ⟨i,j⟩. p[1:k] is a minimum-cost path.
5    {
6         cost[n]:= 0.0;
7         for j := n −1 to 1 step −1 do
8         { //Compute cost[j].
9              Let r be a vertex such that ⟨j,r⟩ is an edge
10                  of G and c[j,r] + cost[r] is minimum;
11             cost[j]:= c[j,r] + cost[r];
12             d[j]:= r; // Remember the decision at this vertex
13        }
14        // Find a minimum-cost path.
15        p[1]:=1; p[k]:= n;
16        for j := 2 to k−1 do p[j] := d[p[j − 1]];
17   }
```

In another aspect, the method of the present invention may including converting the Stop Sequence Problem (SSP) to a Multi-stage Graph Problem (MGP). The solution to the SSP in one embodiment requires finding a pair of entry nodes and exit nodes $\{en_i, ex_i\}$ for each subset Si (i=1, 2, . . . , m) and minimizing:

$$\sum_{i=0}^{m-1}(l_i(en_l, ex_l) + C(ex_i, en_{i+1}))$$

In one embodiment, the method may include constructing a super-node denoted as $\{en_i, ex_i\}$ where $en_i$ is a possible entry node and $ex_i$ is a possible exit node for a particular cell. If a cell has n (n>1) nodes, then there are n(n−1) possible combinations of entry-exit node pairs and, thus, n(n−1) different super-nodes associated with this cell. For a set of m cells, each cell may be treated as a stage in a routing problem. In this aspect, the solution of this SSP may be viewed as a multi-stage process, in which the starting point may be stage 0 (having one super-node; i.e., the depot or hub), the ending point may be stage m+1 (having the same super-node as stage 0), and at each stage one super-node is chosen form the corresponding cell.

Figure 21:
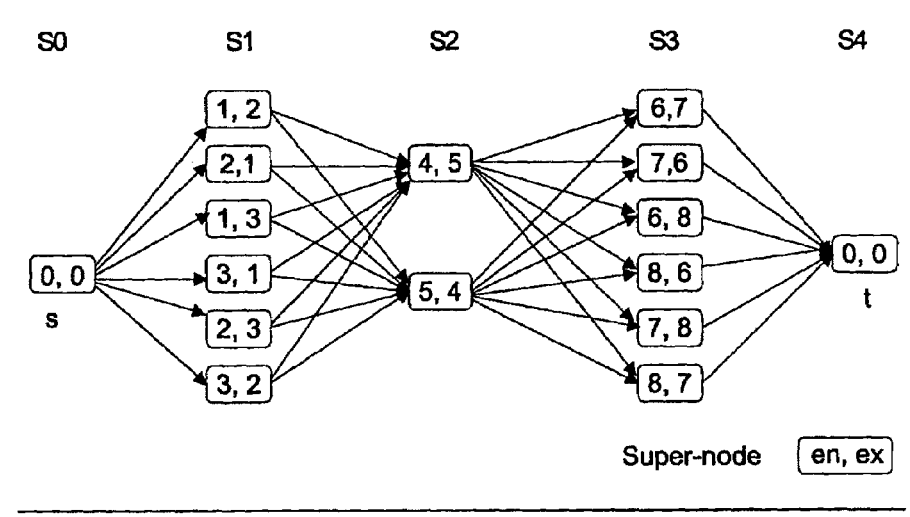
FIG. 21 is an illustration of a multi-stage graph approach to solving a stop sequence problem using super-nodes, according to one embodiment of the present invention.

In effect, this approach forms an m+2 stage graph problem, in which the nodes associated with stage i (1≤i≤m) are the possible super-nodes in cell i. The cost of the edge that connects the two super-nodes $\{en_i, ex_i\}$ and $\{en_{i+1}, ex_{i+1}\}$ in two succeeding stages may be expressed as $l_i$ $(en_i, ex_i)+C(ex_i, en_{i+1})$, where C is the distance matrix between all the nodes in the original graph G. FIG. 21 is an illustration of the MGP approach to solving the original SSP. The MGP approach provides a method of finding the optimal stop sequence for a given cell route.

10. Conclusion

The described embodiments of the invention are intended to be merely exemplary. Numerous variations and modifications will be apparent to those skilled in the art. All such variations and modifications are intended to fall within the scope of the present invention as defined in the appended claims.

What has been described above includes several examples. It is, of course, not possible to describe every conceivable combination of components or methodologies for purposes of describing the systems, methods, computer readable media and so on employed in planning routes. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

While the systems, methods, and apparatuses herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative systems and methods, or illustrative examples shown and described. Accordingly, departures may be made from such details without departing from the spirit or scope of the applicant's general inventive concepts.

What is claimed is:

1. A computer system comprising one or more memory storage areas and one or more processors, the one or more processors configured to:
   (a) electronically select a new driver from a pool of unassigned drivers;
   (b) electronically identify a plurality of cells, wherein each of the plurality of cells comprises (i) a portion of a service territory and (ii) a group of one or more stops;
   (c) electronically classify one or more of said plurality of cells as core cells in response to a known service volume for each of said core cells exceeding a minimum service volume;
   (d) electronically establish one or more core areas, wherein each of said one or more core areas comprises a localized cluster of said one or more core cells;
   (e) electronically select a new core area from said one or more core areas based upon a known driver visit frequency by said new driver to each of said one or more core areas;
   (f) electronically assign said new driver to service said new core area after selecting said new core area; and
   (g) electronically classify said new driver as an assigned driver after assigning said new driver to service said new core area.

2. The system of claim 1, wherein the one or more processors are further configured to:
   electronically classify any cell located outside any of said new core areas as a daily cell;
   electronically select a proximately assigned driver based upon a proximity factor relating each of said new core areas to said daily cell; and
   assign said daily cell to said proximately assigned driver.

3. The system of claim 2, wherein the one or more processors are further configured to:
   electronically classify any stop located outside any of said new core areas or outside any of said daily cells as a daily stop;
   electronically select a proximately assigned stop driver based upon a stop proximity factor relating each of said new core areas to said daily stop; and
   electronically assign said daily stop to said proximately assigned stop driver.

4. The system of claim 1, wherein in order to identify a plurality of cells, the one or more processors are further configured to identify a plurality of cells comprising one or more stops located within an area suitable for service by said new driver during a finite workday.

5. The system of claim 2, wherein said proximity factor comprises at least one of a distance element or a time element.

6. The system of claim 3, wherein said stop proximity factor comprises at least one of a distance element or a time element.

7. The system of claim 1, wherein in order to establish one or more core areas, the one or more processors are further configured to:
   electronically assign one or more core cells to respective core areas based at least in part on one or more of a travel time associated with serving respective core cells, a cell-to-cell travel time associated with respective core areas, or a maximum workday duration.

8. The system of claim 7, wherein the travel time associated with serving respective core cells is determined based at least in part on one or more of a learning curve factor associated with a driver assigned to the core cell, an average time per stop within the core cell, or a mean demand associated with the core cell.

9. The system of claim 7, wherein the cell-to-cell travel time is determined based at least in part on a learning curve factor associated with a driver assigned to the core area.

* * * * *